US012451628B2

(12) United States Patent
Okubo

(10) Patent No.: US 12,451,628 B2
(45) Date of Patent: Oct. 21, 2025

(54) ELECTRICAL CONNECTOR AND ELECTRICAL CONNECTOR SET INCLUDING SAID ELECTRICAL CONNECTOR

(71) Applicant: Murata Manufacturing Co., Ltd., Kyoto-fu (JP)

(72) Inventor: Daisuke Okubo, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 371 days.

(21) Appl. No.: 18/304,075

(22) Filed: Apr. 20, 2023

(65) Prior Publication Data

US 2023/0261397 A1 Aug. 17, 2023

Related U.S. Application Data

(63) Continuation of application No. PCT/JP2021/030537, filed on Aug. 20, 2021.

(30) Foreign Application Priority Data

Oct. 27, 2020 (JP) ................................ 2020-179761

(51) Int. Cl.
*H01R 12/71* (2011.01)
*H01R 12/70* (2011.01)

(52) U.S. Cl.
CPC ........ *H01R 12/7011* (2013.01); *H01R 12/716* (2013.01)

(58) Field of Classification Search
CPC ............. H01R 12/7011; H01R 12/716; H01R 13/405; H01R 12/57; H01R 12/73
See application file for complete search history.

(56) References Cited

U.S. PATENT DOCUMENTS

2004/0142586 A1* 7/2004 Yu .......................... H01R 12/73
439/74
2011/0201226 A1* 8/2011 Suzuki ................ H01R 13/631
439/374

(Continued)

FOREIGN PATENT DOCUMENTS

JP 2006-59589 A 3/2006
JP 2013-065541 A 4/2013

(Continued)

OTHER PUBLICATIONS

International Search Report issued in PCT/JP2021/030537; mailed Oct. 26, 2021.

*Primary Examiner* — Abdullah A Riyami
*Assistant Examiner* — Nelson R. Burgos-Guntin
(74) *Attorney, Agent, or Firm* — Studebaker Brackett PLLC

(57) ABSTRACT

A female electrical connector includes internal terminals, an external terminal surrounding the internal terminals, and a holding member that holds the internal terminals and the external terminal and extends in a long-side direction (X axis direction) and a short-side direction (Y axis direction). The internal terminals are arranged in the long-side direction. The external terminal includes a first contact wall portion closer than the internal terminals to a corner in the long-side direction and a second contact wall portion closer than the internal terminals to a corner in the long-side direction. The first and second contact wall portions face each other in the short-side direction. The holding member includes a first restricting portion close to the first contact wall portion to compensate for misalignment in a mated state and a second restricting portion close to the second contact wall portion to compensate for misalignment in the mated state.

20 Claims, 16 Drawing Sheets

(56) References Cited

U.S. PATENT DOCUMENTS

| | | | | |
|---|---|---|---|---|
| 2011/0201227 | A1* | 8/2011 | Takeuchi | H01R 13/631 439/374 |
| 2012/0231637 | A1* | 9/2012 | Takeuchi | H01R 12/716 439/65 |
| 2013/0012039 | A1* | 1/2013 | Nose | H01R 12/73 439/74 |
| 2013/0280926 | A1* | 10/2013 | Ono | H01R 12/7052 439/65 |
| 2015/0357735 | A1* | 12/2015 | Uratani | H01R 12/716 439/660 |
| 2018/0248287 | A1* | 8/2018 | Ashibu | H01R 12/707 |
| 2018/0287282 | A1* | 10/2018 | Horino | H01R 13/11 |
| 2019/0363467 | A1* | 11/2019 | Ko | H01R 13/26 |
| 2020/0067217 | A1* | 2/2020 | Ashibu | H01R 12/716 |
| 2020/0127400 | A1* | 4/2020 | Sasayama | H01R 4/02 |

FOREIGN PATENT DOCUMENTS

| | | | |
|---|---|---|---|
| JP | 2015-220005 | A | 12/2015 |
| JP | 2018-041648 | A | 3/2018 |
| WO | 2019/021611 | A1 | 1/2019 |
| WO | 2020/162548 | A1 | 8/2020 |

* cited by examiner

ELECTRICAL CONNECTOR AND ELECTRICAL CONNECTOR SET INCLUDING SAID ELECTRICAL CONNECTOR

CROSS-REFERENCE TO RELATED APPLICATIONS

This application claims benefit of priority to International Patent Application No. PCT/JP2021/030537, filed Aug. 20, 2021, and to Japanese Patent Application No. 2020-179761, filed Oct. 27, 2020, the entire contents of each are incorporated herein by reference.

BACKGROUND

Technical Field

The present disclosure relates to an electrical connector and an electrical connector set including the electrical connector.

Background Art

For example, an electrical connector disclosed in WO2019/021611 includes a male electrical connector and a female electrical connector each including internal terminals, an external terminal surrounding the internal terminals, and a holding member holding the internal terminals and the external terminal.

SUMMARY

A male electrical connector and a female electrical connector have a mating tolerance for the removable fitting of the electrical connectors. When a force (e.g., a rotational force) that can cause displacement between the electrical connectors mated with each other is exerted, misalignment can be produced between the electrical connectors due to the mating tolerance, leading to poor contact at contact portions of the external terminal and the internal terminals. The poor contact at the contact portions causes a potential difference, which in turn can produce unwanted resonance.

Accordingly, the present disclosure provides an electrical connector and an electrical connector set including the electrical connector, with an aim of compensating for misalignment between electrical connectors mated with each other, by extension, eliminating or reducing the occurrence of poor contact at contact portions.

An electrical connector according to an embodiment of the present disclosure is a female electrical connector including a plurality of internal terminals, an external terminal, and a holding member. The external terminal surrounds the plurality of internal terminals. The holding member holds the plurality of internal terminals and the external terminal and extends in a long-side direction and a short-side direction. The plurality of internal terminals are arranged in the long-side direction. The external terminal includes a first contact wall portion closer than the plurality of internal terminals to a corner in the long-side direction and a second contact wall portion closer than the plurality of internal terminals to a corner in the long-side direction. The first and second contact wall portions face each other in the short-side direction. The holding member includes a first restricting portion located close to the first contact wall portion to compensate for misalignment in a mated state and a second restricting portion located close to the second contact wall portion to compensate for misalignment in the mated state.

The present disclosure offers an advantage in that the first restricting portion in close proximity to the first contact wall portion close to the corner in the long-side direction and the second restricting portion in close proximity to the second contact wall portion close to the corner compensate for misalignment in the mated state and thus eliminate or reduce the occurrence of poor contact at contact portions.

DETAILED DESCRIPTION

An electrical connector 10 and an electrical connector set 1 according to an embodiment of the present disclosure will be described below with reference to the accompanying drawings. The electrical connector 10 is included in the electrical connector set 1. For convenience, three axes orthogonal to one another in each drawing are denoted by X, Y, and Z, respectively. The long-side direction, the short-side direction, and the insertion and removal direction of the electrical connector 10 are herein defined by the X axis, the Y axis, and the Z axis, respectively.

[Electrical Connector Set]

Figure 1:
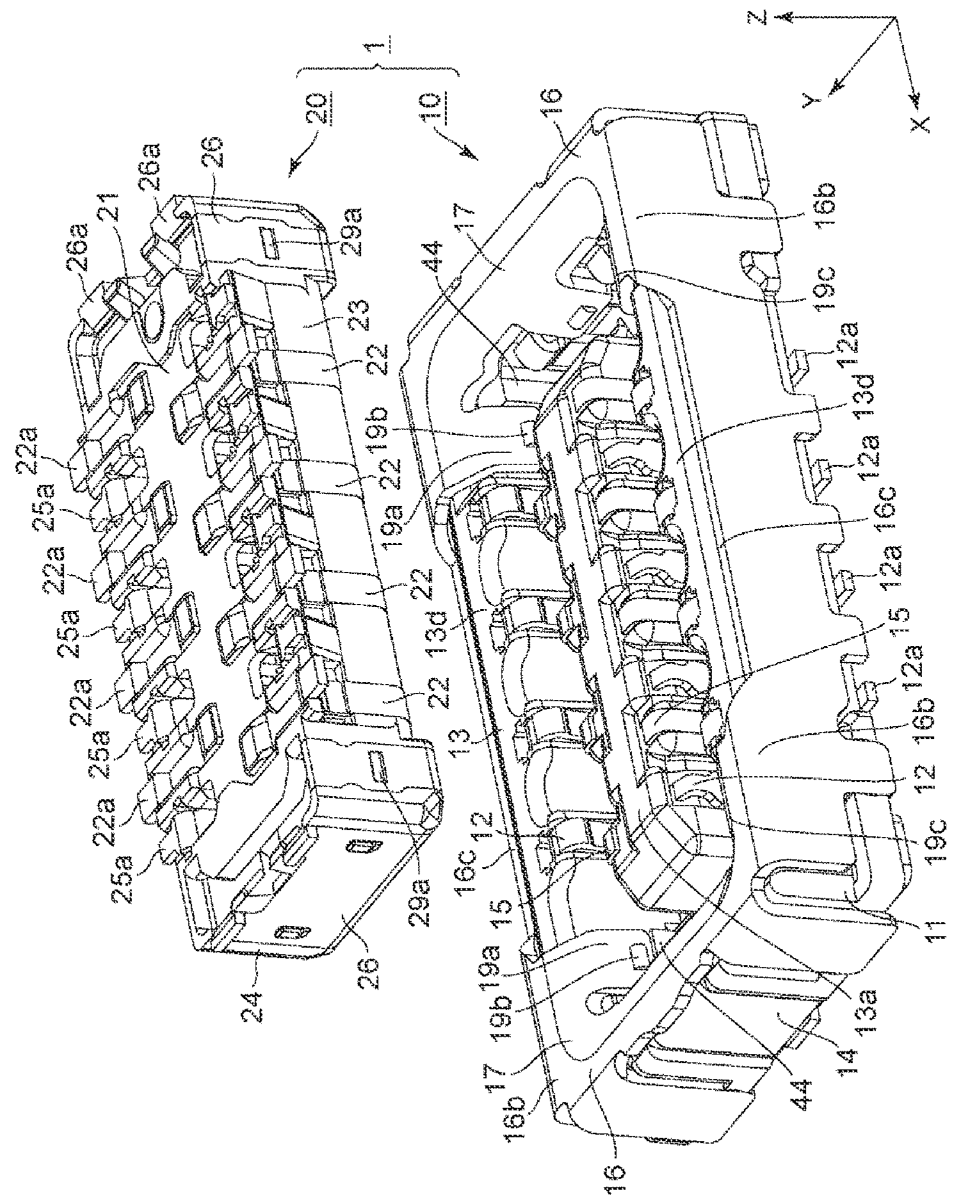
FIG. 1 is a perspective view of an electrical connector set according to a first embodiment, illustrating a demated state of the electrical connector set.
Figure 2:
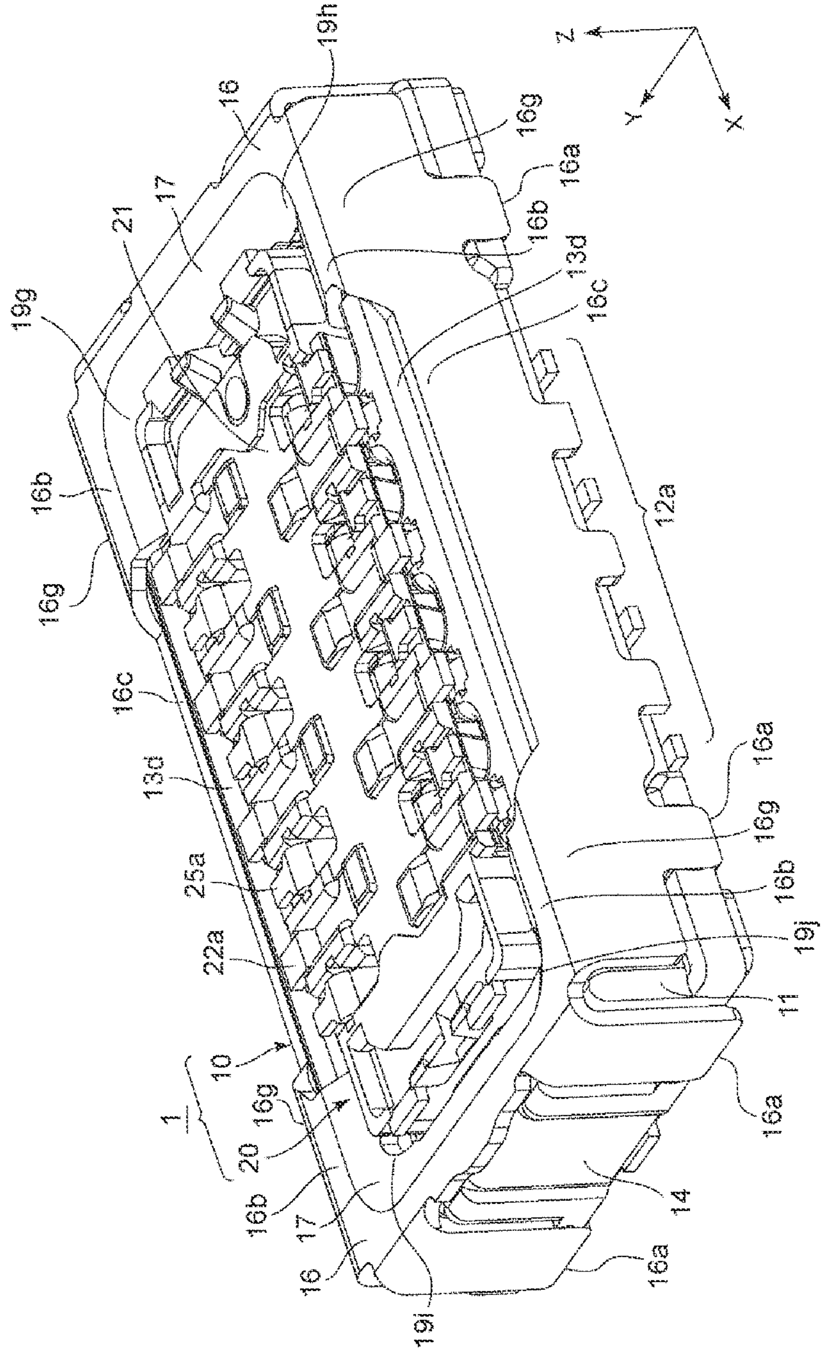
FIG. 2 is a perspective view of the electrical connector set in FIG. 1, illustrating a mated state of the electrical connector set.
Figure 3:
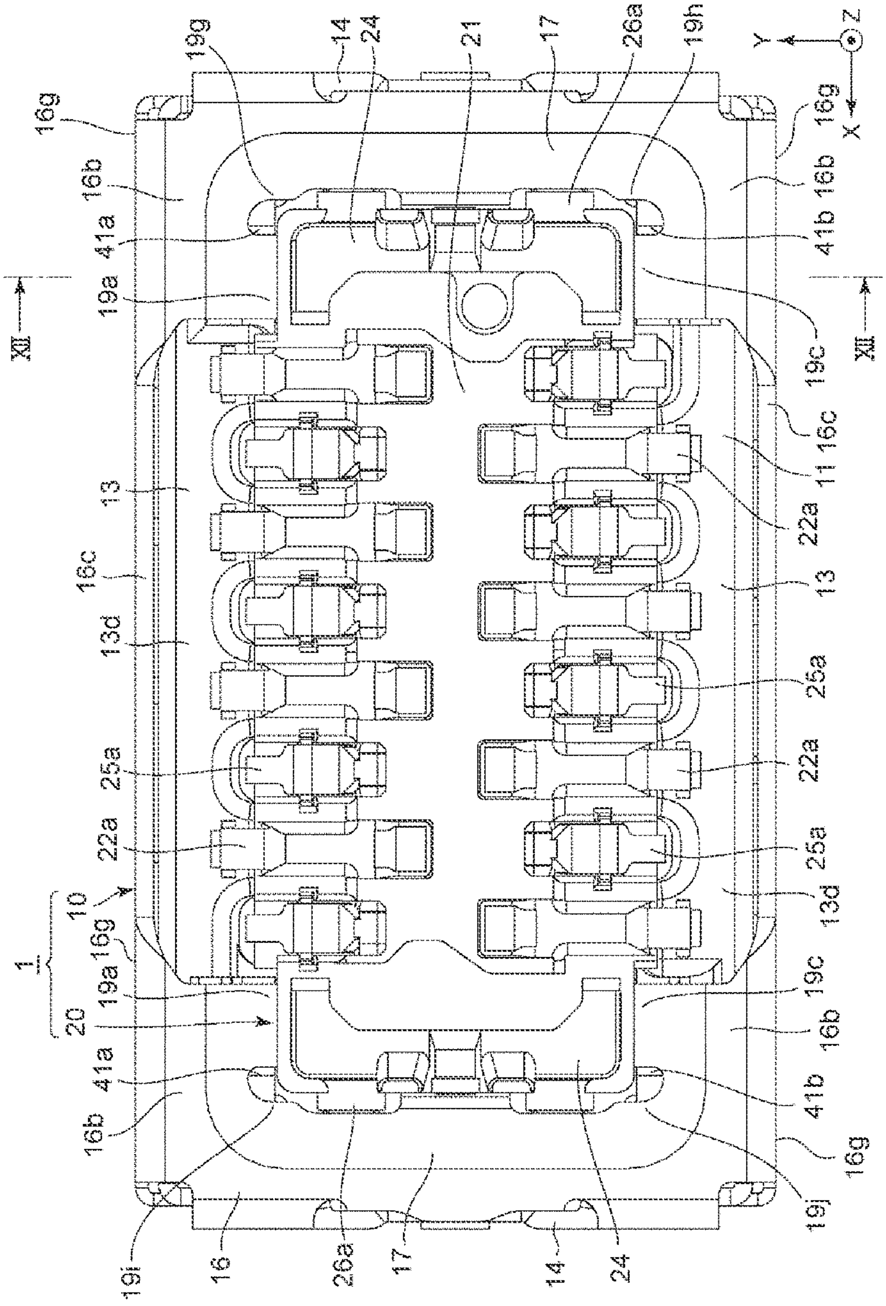
FIG. 3 is a plan view of the electrical connector set illustrated in FIG. 2.

FIG. 1 is a perspective view of the electrical connector set 1 according to a first embodiment, illustrating a demated state of the electrical connector set 1. FIG. 2 is a perspective view of the electrical connector set 1 in FIG. 1, illustrating a mated state of the electrical connector set 1. FIG. 3 is a plan view of the electrical connector set 1 illustrated in FIG. 2.

Referring to FIGS. 1 to 3, the electrical connector set 1 includes a female electrical connector and a male electrical connector, which are denoted by 10 and 20, respectively. The male electrical connector is removably fitted into the female electrical connector 10 in the insertion and removal direction (the Z axis direction). With the male electrical connector 20 facing the female electrical connector 10, the male electrical connector 20 is shifted in the insertion and removal direction (the Z axis direction) to the female electrical connector 10. Accordingly, the female electrical connector 10 and the male electrical connector 20 of the electrical connector set 1 are mated with each other. The female electrical connector 10 and the male electrical connector 20 disclosed herein are illustrated as follows: the overall size of the male electrical connector 20 is smaller than the overall size of the female electrical connector 10, and the male electrical connector 20 is fitted and accommodated in the female electrical connector 10.

[Male Electrical Connector]

Figure 4:
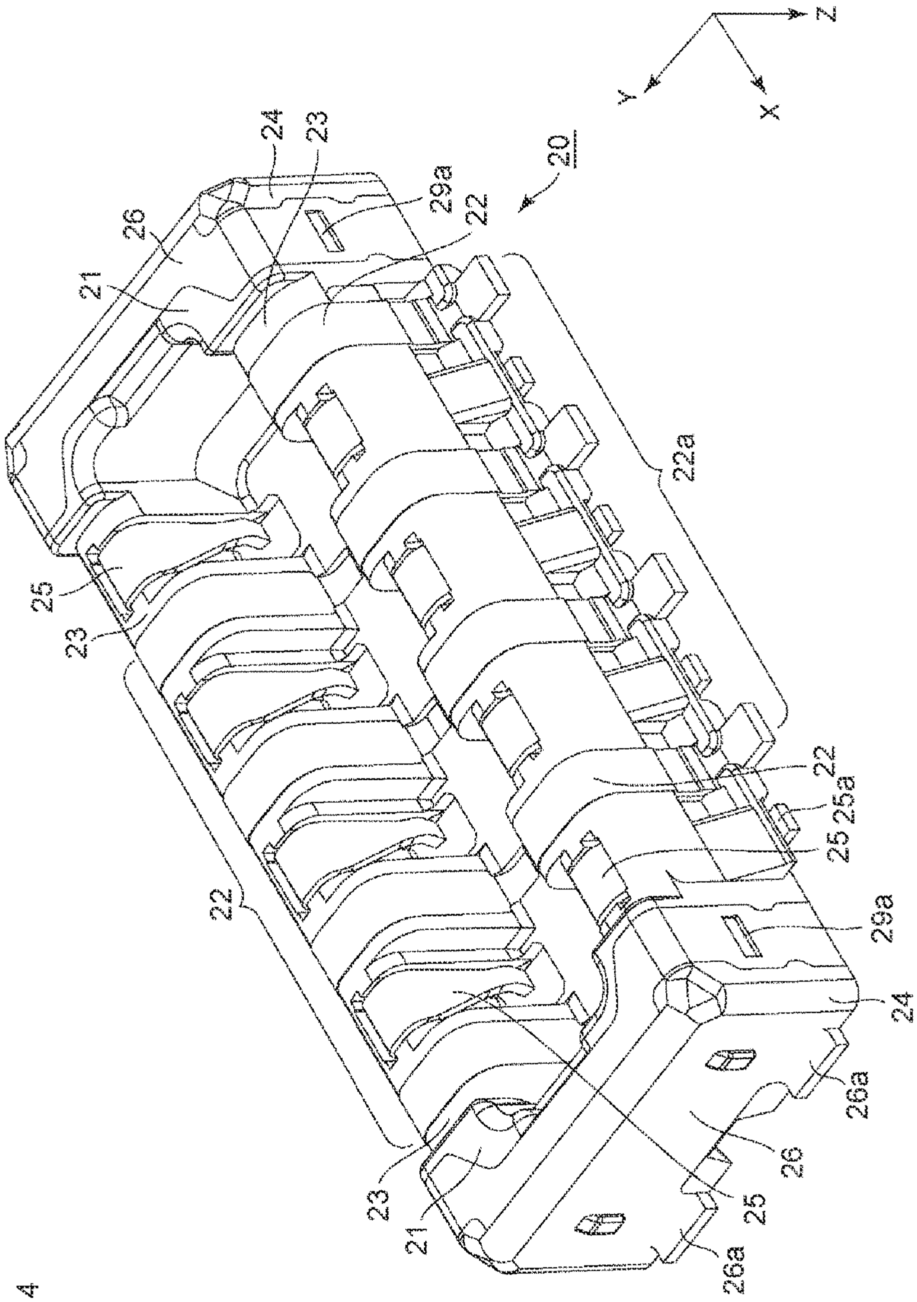
FIG. 4 is a perspective view of a male electrical connector included in the electrical connector set illustrated in FIG. 1.
Figure 5:
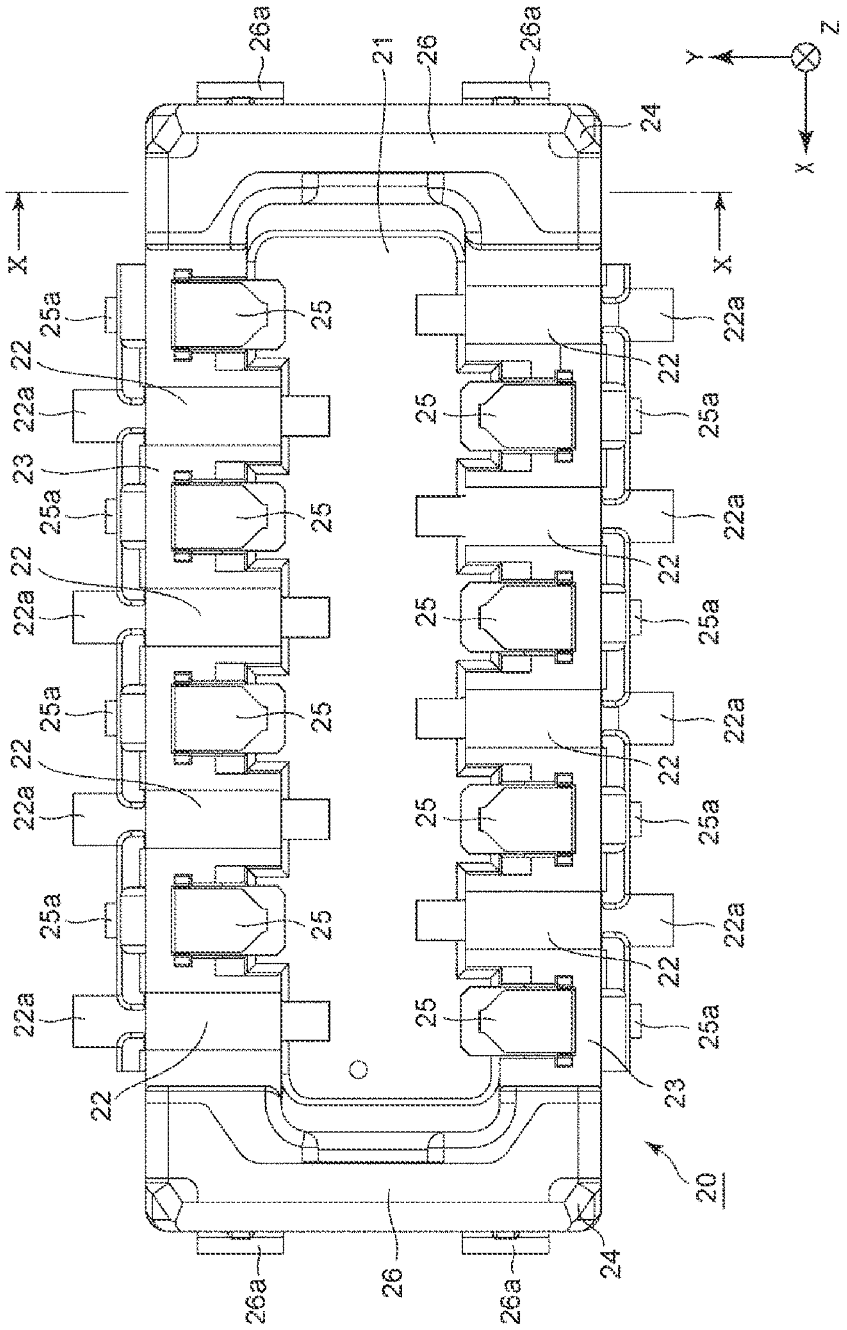
FIG. 5 is a plan view of the male electrical connector illustrated in FIG. 4.

The following describes the configuration of the male electrical connector 20 with reference to FIGS. 4 and 5. FIG. 4 is a perspective view of the male electrical connector 20 included in the electrical connector set 1 illustrated in FIG. 1. FIG. 5 is a plan view of the male electrical connector 20 illustrated in FIG. 4.

The male electrical connector 20 includes a second holding member 21, second internal terminals 22, second shield terminals 25, and a second external terminal 26. The second holding member 21 is made of an electrical insulating resin, such as a liquid crystal polymer. The second holding member 21 includes two second terminal holding portions 23 and two second lateral support portions 24. The two second terminal holding portions 23 each extend in the long-side direction of the male electrical connector 20 (in the X axis direction) and are discretely located away from each other in the short-side direction (the Y axis direction). The two second lateral support portions 24 are opposite end portions of the male electrical connector 20 and are discretely located away from each other in the long-side direction (the X axis direction).

The second terminal holding portions 23 each include second internal terminal catching portions, each of which is in the form of a recess. The second internal terminals 22 are caught in the second internal terminal catching portions such that the second internal terminals 22 are held in place. The second internal terminals 22 are arranged in the long-side direction of the male electrical connector 20 (in the X axis direction). There is a one-to-one correspondence between the second internal terminals 22 and first internal terminals 12, which will be described later. Each of the second internal terminals 22 is engaged with the corresponding one of the first internal terminals 12 to form an electrical connection.

For example, the second internal terminals 22 are conductors connected to signal potential or ground potential and are each obtained by bending an electrically conductive member having a rod shape. The second internal terminals 22 may be made of phosphor bronze. Phosphor bronze is electrically conductive and is elastically deformable. The second internal terminals 22 may be plated with gold. The second internal terminals 22 each include a second internal mounting portion **22*a* for mounting on a land electrode of a circuit board (not illustrated). Each of the second internal mounting portions 22*a*** is a lateral end in the short-side direction (the Y axis direction) and is also a lower end in the insertion and removal direction (the Z axis direction).

Each of the second shield terminals 25 is electrically conductive and is disposed between the second internal terminals 22 adjacent to each other in the long-side direction (the X axis direction) to suppress interference of electromagnetic waves between the second internal terminals 22 adjacent to each other in the long-side direction (the X axis direction), that is, to provide isolation between the second internal terminals 22 in each row. For example, second shield terminal catching portions each being in the form of a recess may be provided such that each of the second shield terminals 25 is caught and held in the corresponding one of the second shield terminal catching portions. The second shield terminals 25 each extend in the short-side direction (the Y axis direction).

For example, the second shield terminals 25 are conductors connected to the ground potential and are each obtained by bending an electrically conductive member having a rod shape. The second shield terminals 25 may be made of phosphor bronze. Phosphor bronze is electrically conductive and is elastically deformable. The second shield terminals 25 may be plated with gold. The second shield terminals 25 each include a second shield mounting portion **25*a* for mounting on the land electrode of the circuit board (not illustrated). Each of the second shield mounting portions 25*a*** is a lateral end in the short-side direction (the Y axis direction) and is also a lower end in the insertion and removal direction (the Z axis direction).

The second external terminal 26 is caught and supported by the second lateral support portions 24. The second external terminal 26 includes second external mounting portions **26*a* for mounting on the land electrode of the circuit board (not illustrated). Each of the second external mounting portions 26*a*** is a lower end in the insertion and removal direction (the Z axis direction).

The second external terminal 26 is a conductor connected to the ground potential. The second external terminal 26 connected to the ground potential serves as a shield against extraneous electromagnetic waves and unwanted radiation from the second internal terminals 22. Accordingly, the space surrounded by the second external terminal 26 is shielded from electromagnetic waves. That is, the second external terminal 26 is a member that provides electromagnetic shielding for the second internal terminals 22. The second external terminal 26 may be made of phosphor bronze. Phosphor bronze is electrically conductive and is elastically deformable. The second external terminal 26 may be obtained by a bending process.

[Female Electrical Connector]

Figure 6:
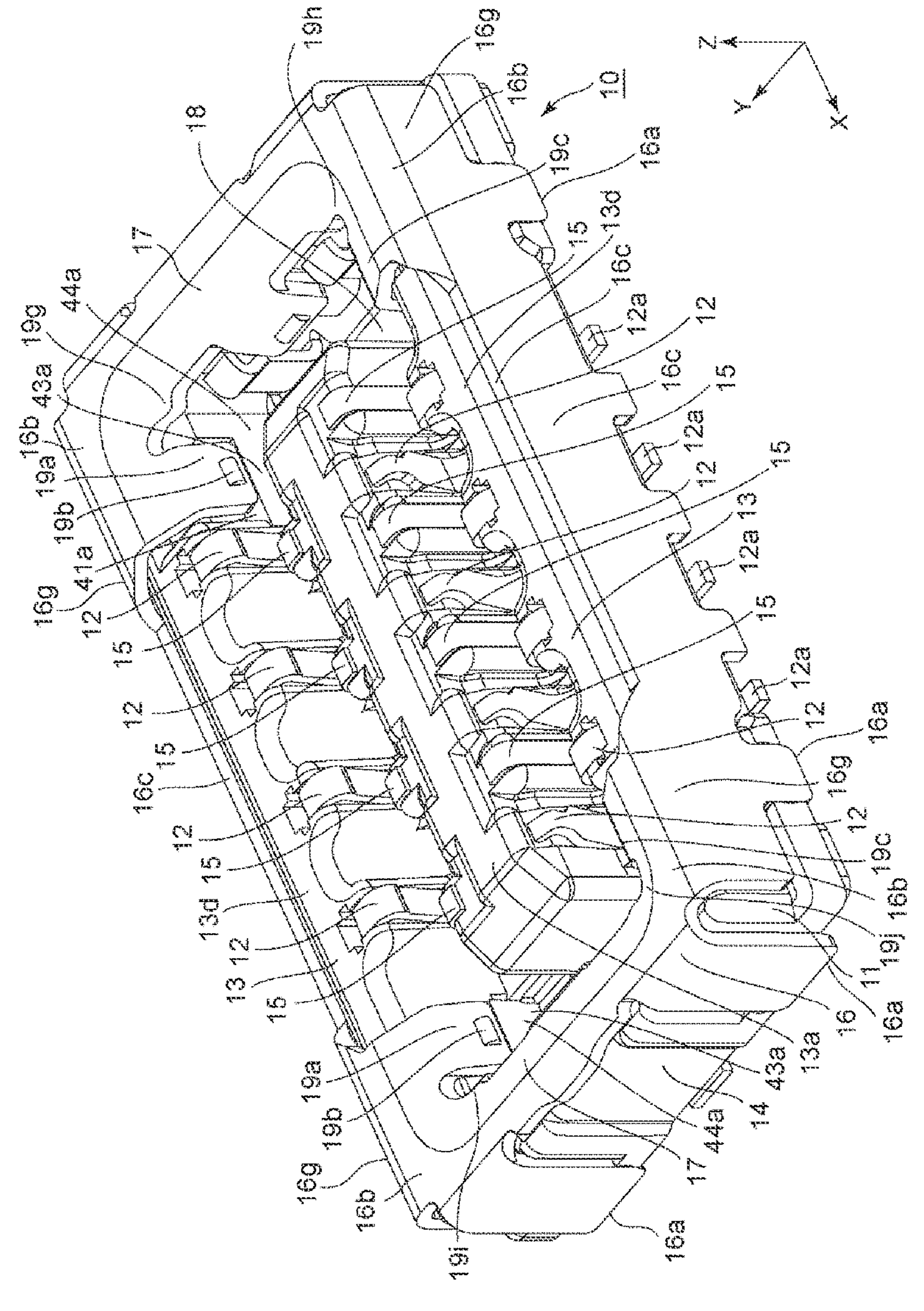
FIG. 6 is a perspective view of a female electrical connector included in the electrical connector set illustrated in FIG. 1.
Figure 7:
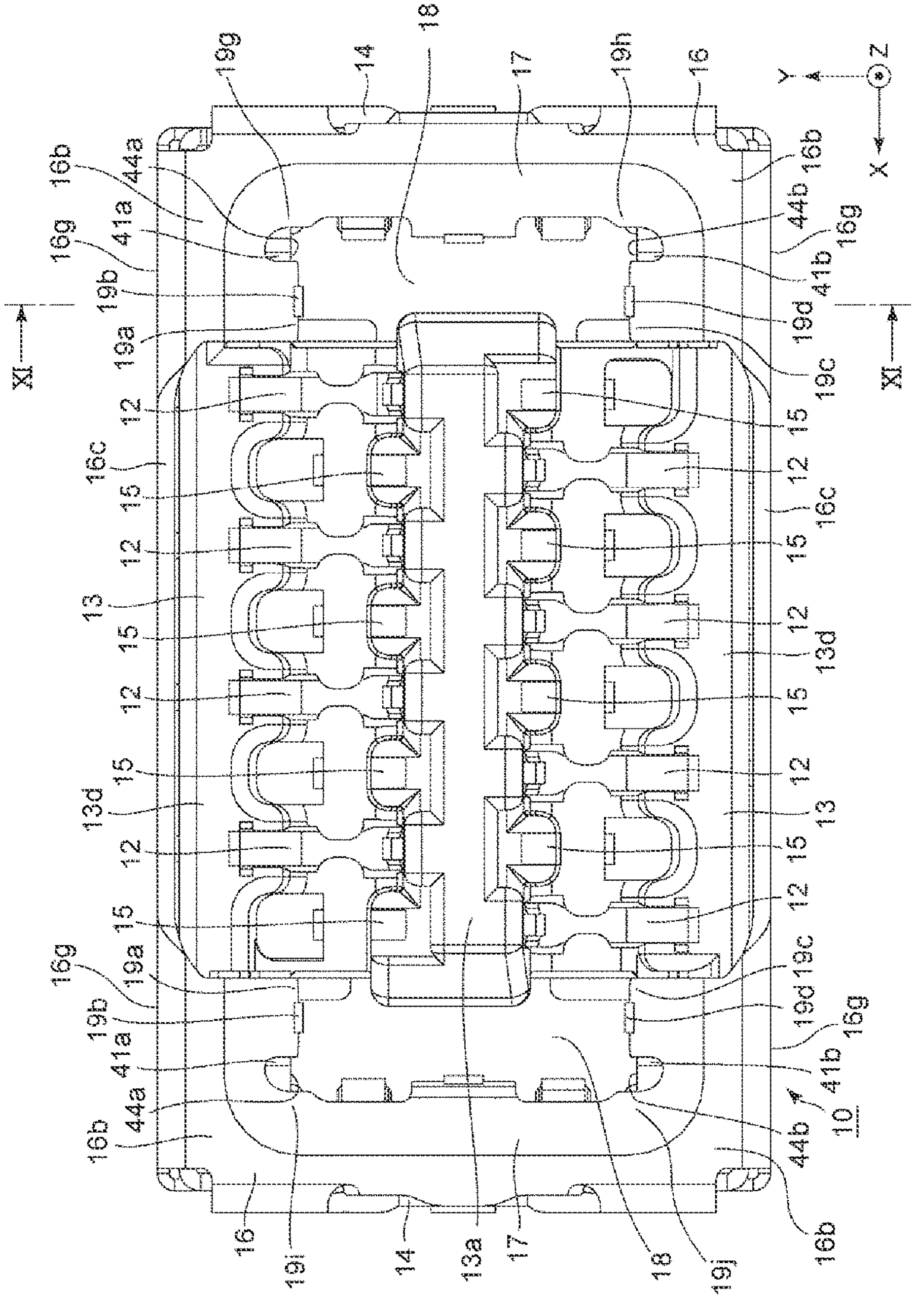
FIG. 7 is a plan view of the female electrical connector illustrated in FIG. 6.
Figure 8:
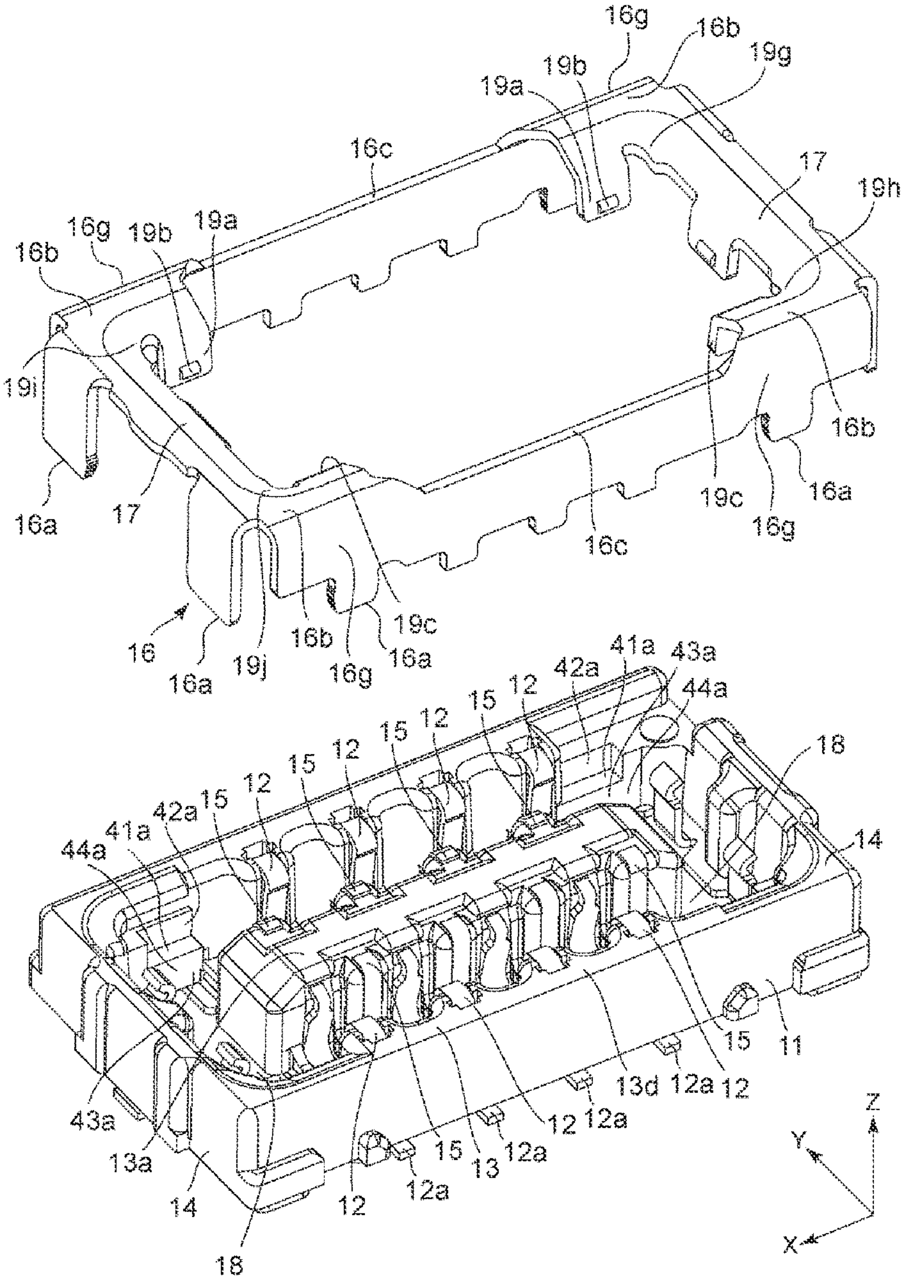
FIG. 8 is an exploded perspective view of the female electrical connector illustrated in FIG. 6.
Figure 9:
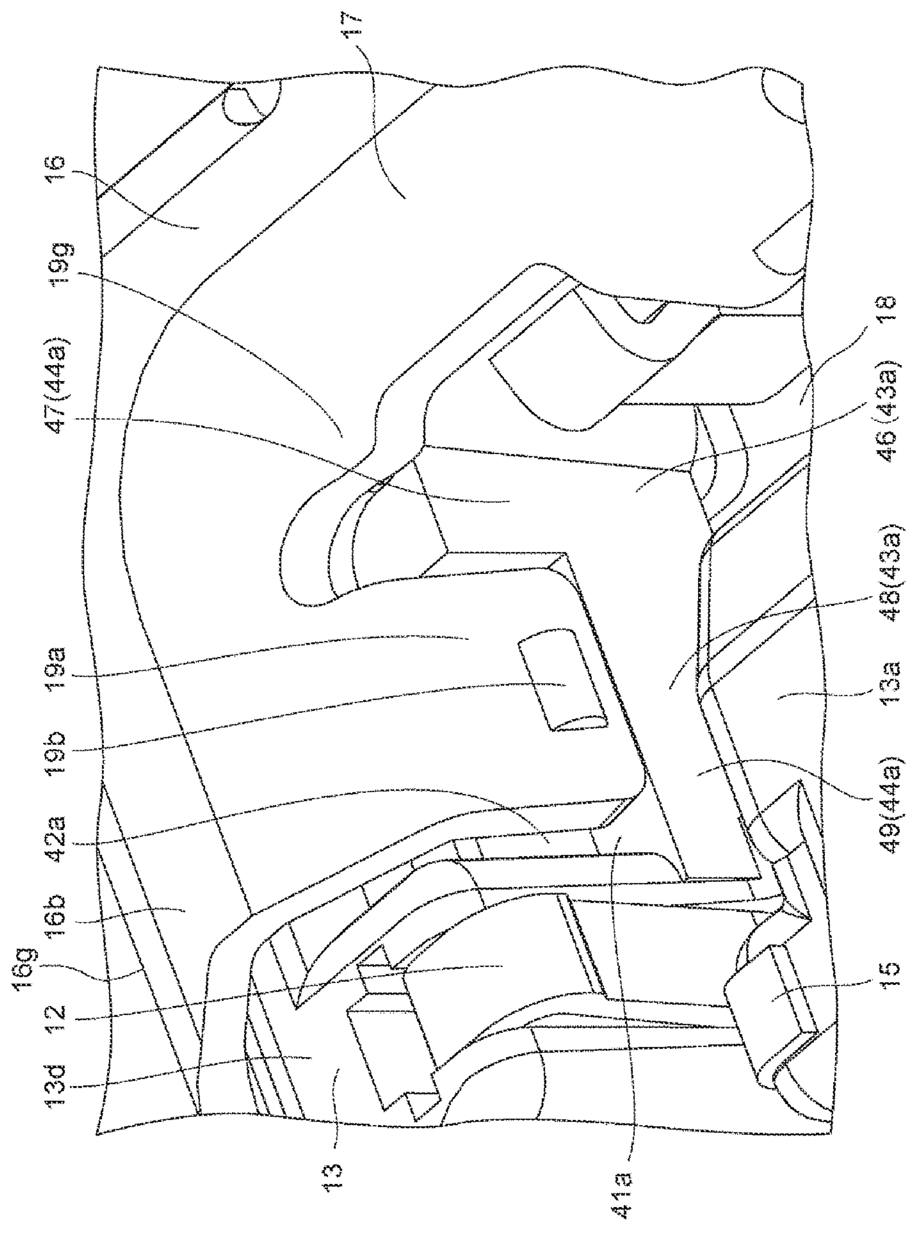
FIG. 9 is an enlarged perspective view of a principal part of the female electrical connector illustrated in FIG. 6.

The following describes the configuration of the female electrical connector 10 with reference to FIGS. 6 to 9. FIG. 6 is a perspective view of the female electrical connector 10 included in the electrical connector set 1 illustrated in FIG. 1. FIG. 7 is a plan view of the female electrical connector 10 illustrated in FIG. 6. FIG. 8 is an exploded perspective view of the female electrical connector 10 illustrated in FIG. 6. FIG. 9 is an enlarged perspective view of a principal part of the female electrical connector 10 illustrated in FIG. 6.

The female electrical connector 10 includes a first holding member (holding member) 11, first internal terminals (internal terminals) 12, first shield terminals (shield terminals) 15, and a first external (external terminal) 16. The first holding member 11 is made of an electrical insulating resin, such as a liquid crystal polymer. The first holding member 11 has a rectangular shape extending in both the long-side direction and the short-side direction of the female electrical connector 10. The first holding member 11 includes two first terminal lateral holding portions (terminal holding portions) 13 and two first lateral support portions 14. The two first terminal lateral holding portions 13 each extend in the long-side direction (the X axis direction) and are discretely located away from each other in the short-side direction (the Y axis direction). The two first lateral support portions 14 are opposite end portions of the female electrical connector 10 and are discretely located away from each other in the long-side direction (the X axis direction).

A first terminal center holding portion 13*a* and a first extending portion 13*d* of each of the first terminal lateral holding portions 13 each include first internal terminal catching portions, each of which is in the form of a recess. The first internal terminals 12 are caught in the first internal terminal catching portions such that the first internal terminals 12 are held in place. The first internal terminals 12 are arranged in the long-side direction of the female electrical connector 10 (in the X axis direction). There is a one-to-one correspondence between the first internal terminals 12 and the second internal terminals 22 mentioned above. Each of the first internal terminals 12 is engaged with the corresponding one of the second internal terminals 22 to form an electrical connection.

Referring to FIGS. 6 to 8, the first internal terminals 12 are aligned in two rows in the long-side direction. For example, four first internal terminals 12 are included in each row. The first row of the first internal terminals 12 and the second row of the first internal terminals 12 extend side by side the short-side direction (the Y axis direction) and are discretely located away from each other in the short-side direction (the Y axis direction). Although the region for placement of the first internal terminals 12 in the first terminal lateral holding portions 13 is limited, this layout enables a larger number of first internal terminals to be disposed in the area. It is not required that the first internal terminals 12 be aligned in two rows (the first row and the second row). The first internal terminals 12 may be aligned in one row or may be aligned in three or more rows. It is not required that four first internal terminals 12 be included in each row. The number of internal terminals in each row may be equal to or less than three or may be equal to or greater than five.

For example, the first internal terminals 12 are conductors connected to the signal potential or the ground potential and are each obtained by bending an electrically conductive member having a rod shape. The first internal terminals 12 may be made of phosphor bronze. Phosphor bronze is electrically conductive and is elastically deformable. The first internal terminals 12 may be plated with gold. The first internal terminals 12 each include a first internal mounting portion 12*a* for mounting on a land electrode of a circuit board (not illustrated). Each of the first internal mounting portions 12*a* is a lateral end in the short-side direction.

Each of the first shield terminals (shield terminals) 15 is electrically conductive and is disposed between the first internal terminals 12 adjacent to each other in the long-side direction (the X axis direction) to suppress interference of electromagnetic waves between the first internal terminals 12 adjacent to each other in the long-side direction (the X axis direction), that is, to provide isolation between the first internal terminals 12 in each row. For example, first shield terminal catching portions each being in the form of a recess may be provided such that each of the first shield terminals 15 is caught and held in the corresponding one of the first shield terminal catching portions. The first shield terminals 15 each extend in the short-side direction (the Y axis direction). The first internal terminals 12 are connection terminals each being in the form of a recess. In some embodiments, the first internal terminals 12 are connection terminals each being in the form of a protrusion. In such an embodiment, the second internal terminals 22 that are to be engaged with the respective first internal terminals 12 are connection terminals each being in the form of a recess, instead being connection terminals each being in the form of a protrusion.

For example, the first shield terminals 15 are conductors connected to the ground potential and are each obtained by bending an electrically conductive member having a rod shape. The first shield terminals 15 may be made of phosphor bronze. Phosphor bronze is electrically conductive and is elastically deformable. The first shield terminals 15 may be plated with gold. The first shield terminals 15 each include a first shield mounting portion (not illustrated) for mounting on the land electrode of the circuit board (not illustrated). Each of the first shield mounting portions is a lateral end in the short-side direction (the Y axis direction) and is also a lower end in the insertion and removal direction (the Z axis direction).

When viewed in the insertion and removal direction (the Z axis direction), the first external terminal 16 is in the shape of a rectangular closed frame defined by a perimeter with which the array of the first internal terminals 12 is surrounded. That is, the first external terminal 16 in the shape of a rectangular frame has long sides extending in the long-side direction (the X axis direction) and short sides extending in the short-side direction (the Y axis direction). It is not required that the shape of the first external terminal 16 be defined by a perimeter of a polygonal shape. The shape of the first external terminal 16 may be defined by a perimeter of a circular shape, a perimeter of an elliptical shape, or a combination of a perimeter of a polygonal shape and a perimeter of a circular shape.

The first external terminal 16 is a conductor connected to the ground potential. The first external terminal 16 connected to the ground potential serves as a shield against extraneous electromagnetic waves and unwanted radiation from the first internal terminals 12. Accordingly, the space surrounded by the first external terminal 16 is shielded from electromagnetic waves. That is, the first external terminal 16 surrounding the first internal terminals 12 provides electromagnetic shielding for the first internal terminals 12. The first external terminal 16 may be made of phosphor bronze. Phosphor bronze is electrically conductive and is elastically deformable. The first external terminal 16 may be obtained by a bending process.

The first external terminal 16 includes first external lateral portions 16*b*. Each of the first external lateral portions 16*b* is attached to and supported by the corresponding one of the first lateral support portions 14 of the first holding member 11. The first external lateral portions 16*b* each include first external mounting portions 16*a* for mounting on a ground electrode of the circuit board (not illustrated). Each of the first external mounting portions 16*a* is a lower end in the insertion and removal direction (the Z axis direction).

The first external terminal 16 includes two first external lateral portions (external lateral portions) 16*b*, two first external extending portions (external extending portions) 16*c*, two guide portions 17, two catching cavities 18, two first contact wall portions 19*a*, and two second contact wall portions 19*c*. The first external lateral portions 16*b* are lateral portions located on one side (e.g., the right side in FIG. 7) and the other side (e.g., the left side in FIG. 7), respectively, in the long-side direction (the X axis direction).

The first external terminal 16 has corners 19*g*, 19*h*, 19*i*, and 19*j*, each of which is a point where a long side and a short side meet. The corner denoted by 19*g* is a first right corner located on one side in the long-side direction (the X axis direction) (e.g., the right side in FIG. 7) and on a first side in the short-side direction (the Y axis direction) (e.g., the upper side in FIG. 7). The corner denoted by 19*h* is a second right corner located on one side in the long-side direction (the X axis direction) (e.g., the right side in FIG. 7) and on a second side in the short-side direction (the Y axis direction) (e.g., the lower side in FIG. 7). The corner denoted by 19*i* is a first left corner located on the other side in the long-side direction (the X axis direction) (e.g., the left side in FIG. 7) and on the first side in the short-side direction (the Y axis direction) (e.g., the upper side in FIG. 7). The corner denoted by 19*j* is a second left corner located on the other side in the long-side direction (the X axis direction) (e.g., the left side in FIG. 7) and on the second side in the short-side direction (the Y axis direction) (e.g., the lower side in FIG. 7).

The first external lateral portion 16*b* located on one side in the long-side direction (the X axis direction) (e.g., the right side in FIG. 7) includes one of the guide portions 17, one of the catching cavities 18, one of the first contact wall portions 19*a*, one of the second contact wall portions 19*c*, and first lateral external surface portions, each of which is denoted by 16*g*. The first contact wall portion 19*a* located on one side in the long-side direction (the X axis direction) (e.g., the right side in FIG. 7) is closer than one end (e.g., the right end in FIG. 7) of one of the rows of the first internal terminals 12 to the first right corner 19*g* in the long-side direction (the X axis direction) and is on the inner side with respect to the first side in the short-side direction (the Y axis direction) (e.g., the upper side in FIG. 7). The second contact wall portion 19*c* located on one side in the long-side direction (the X axis direction) (e.g., the right side in FIG. 7) is closer than one end (e.g., the right end in FIG. 7) of the other row of the first internal terminals 12 to the second right corner 19*h* in the long-side direction (the X axis direction) and is on the inner side with respect to the second side in the short-side direction (the Y axis direction) (e.g., the lower side in FIG. 7). The first contact wall portion 19*a* and the second contact wall portion 19*c* on one side in the long-side direction (the X axis direction) (e.g., the right side in FIG. 7) face each other in the short-side direction (the Y axis direction). The first contact wall portion 19*a* and the second contact wall portion 19*c* on one side in the long-side direction (the X axis direction) (e.g., the right side in FIG. 7) do not overlap the first internal terminals 12 in the long-side direction (the X axis direction) when viewed in the short-side direction (the Y axis direction). In other words, the other end (e.g., the left end in FIG. 7) of the first contact wall portion 19*a* located on one side in the long-side direction (the X axis direction) (e.g., the right side in FIG. 7) is closer than one end (e.g., the right end in FIG. 7) of one of the rows of the first internal terminals 12 to the first right corner 19*g* in the long-side direction (the X axis direction). The other end (e.g., the left end in FIG. 7) of the second contact wall portion 19*c* located on one side in the long-side direction (the X axis direction) (e.g., the right side in FIG. 7) is closer than one end (e.g., the right end in FIG. 7) of the other row of the first internal terminals 12 to the second right corner 19*h* in the long-side direction (the X axis direction).

The first external lateral portion 16*b* located on the other side in the long-side direction (the X axis direction) (e.g., the left side in FIG. 7) includes the other one of the guide portions 17, the other one of the catching cavities 18, the other one of the first contact wall portions 19*a*, the other one of the second contact wall portions 19*c*, and first lateral external surface portions, each of which is denoted by 16*g*. The first contact wall portion 19*a* located on the other side in the long-side direction (the X axis direction) (e.g., the left side in FIG. 7) is closer than the other end (e.g., the left end in FIG. 7) of one of the rows of the first internal terminals 12 to the first left corner 19*i* in the long-side direction (the X axis direction) and is on the inner side with respect to the first side in the short-side direction (the Y axis direction) (e.g., the upper side in FIG. 7). The second contact wall portion 19*c* located on the other side in the long-side direction (the X axis direction) (e.g., the left side in FIG. 7) is closer than the other end (e.g., the left end in FIG. 7) of the other row of the first internal terminals 12 to the second left corner 19*j* in the long-side direction (the X axis direction) and is on the inner side with respect to the second side in the short-side direction (the Y axis direction) (e.g., the lower side in FIG. 7). The first contact wall portion 19*a* and the second contact wall portion 19*c* on the other side in the long-side direction (the X axis direction) (e.g., the left side in FIG. 7) face each other in the short-side direction (the Y axis direction). The first contact wall portion 19*a* and the second contact wall portion 19*c* on the other side in the long-side direction (the X axis direction) (e.g., the left side in FIG. 7) do not overlap the first internal terminals 12 in the long-side direction (the X axis direction) when viewed in the short-side direction (the Y axis direction). In other words, one end (e.g., the right end in FIG. 7) of the first contact wall portion 19*a* located on the other side in the long-side direction (the X axis direction) (e.g., the left side in FIG. 7) is closer than the other end (e.g., the left end in FIG. 7) of one of the rows of the first internal terminals 12 to the first left corner 19*i* in the long-side direction (the X axis direction). One end (e.g., the right end in FIG. 7) of the second contact wall portion 19*c* located on the other side in the long-side direction (the X axis direction) (e.g., the left side in FIG. 7) is closer than the other end (e.g., the left end in FIG. 7) of the other row of the first internal terminals 12 to the second left corner 19*j* in the long-side direction (the X axis direction).

A pair of restricting portions is located on one side in the long-side direction (the X axis direction) (e.g., the right side in FIG. 7), and another pair of restricting portions is located on the other side in the long-side direction (the X axis direction) (e.g., the left side in FIG. 7). The pairs of restricting portions each include a first restricting portion 43*a* and a second restricting portion 43*b*. In other words, one pair of restricting portions including the first restricting portion 43*a* and the second restricting portion 43*b* and another pair of restricting portions including the first restricting portion 43*a* and the second restricting portion 43*b* are located on opposite sides with respect to a plane orthogonal to the long-side direction (the X axis direction). Thus, misalignment of the male electrical connector 20 in the mated state is more effectively compensated for, and the occurrence of poor contact between contact portions will be eliminated or reduced accordingly. Furthermore, one pair of restricting portions including the first restricting portion 43*a* and the second restricting portion 43*b* and another pair of restricting portions including the first restricting portion 43*a* and the second restricting portion 43*b* are arranged symmetrically about a plane orthogonal to the long-side direction (the X axis direction). This feature simplifies the structure of the female electrical connector 10, which is thus less costly. The first restricting portions 43*a* and the second restricting portions 43*b* are made of a resin material that is the base material of the first holding member 11 and are integral with the first holding member 11. The base material of the first holding member 11 is herein denoted by 11*a*. The first holding member 11 can thus be produced at low cost.

The first contact wall portions 19*a* each have an inner side surface including a first contact engagement portion 19*b*, which protrudes inward in the short-side direction (the Y axis direction). The second contact wall portions 19*c* each have an inner side surface including a second contact engagement portion 19*d*, which protrudes inward in the short-side direction (the Y axis direction). When the female electrical connector 10 and the male electrical connector 20 are mated with each other, the first contact engagement portions 19*b* and the second contact engagement portions 19*d* of the first external terminal 16 are caught in the respective engagement target portions of the second external terminal 26. The first contact engagement portions 19*b* and the second contact engagement portions 19*d* are each in the form of a protrusion. The engagement target portions of the second external terminal 26 are each in the form of a recess and are herein referred to as second engagement target portions 29*a*. This provides a secure fit without affecting the first internal terminals 12 and the first shield terminals 15. The first contact engagement portions 19*b* and the second contact engagement portions 19*d* each act as a contact portion that forms an electrical connection between the first external terminal 16 and the second external terminal 26.

The first external lateral portions 16*b* are each substantially U-shaped when viewed in the insertion and removal direction (the Z axis direction). The guide portions 17 are each substantially U-shaped when viewed in the insertion and removal direction (the Z axis direction) and slope downward from the outer side toward the inner side. The guide portions 17 each serve as a guide for leading the second external terminal 26 into the catching cavities 18 accurately when the male electrical connector 20 is inserted into the female electrical connector 10 in the insertion and removal direction. The catching cavities 18 are located on the inner side with respect to the respective guide portions 17 and are substantially rectangular when viewed in the insertion and removal direction (the Z axis direction). The first lateral external surface portions 16*g* of each of the first external lateral portions 16*b* are external surfaces located on the respective sides in the short-side direction (the Y axis direction). The first lateral external surface portions 16*g* each extend in both the long-side direction (the X axis direction) and the insertion and removal direction (the Z axis direction).

The two first external extending portions 16*c* each extend in the long-side direction (the X axis direction) and connects the first external lateral portion 16*b* on one side in the long-side direction (the X axis direction) to the first external lateral portion 16*b* on the other side in the long-side direction (the X axis direction). For example, the first external extending portions 16*c* extend straight in the long-side direction (the X axis direction). The first external extending portions 16*c* having a linear shape can be machined without a high degree of complexity. The two first external extending portions 16*c* are discretely located away from each other in the short-side direction (the Y axis direction). The lower part of each of the first external extending portions 16*c* includes the first external mounting portions 16*a* for mounting on the ground electrode of the circuit board (not illustrated).

Referring to FIG. 8, each first contact wall portion 19*a* and the corresponding second contact wall portion 19*c* extend substantially in the insertion and removal direction (the Z axis direction) from the respective first external lateral portion 16*b*, with the guide portion 17 being located between the first contact wall portion 19*a* and the second contact wall portion 19*c*, each of which is cantilevered at the corresponding one of the first external lateral portions 16*b*. This enables the first contact wall portions 19*a* and the second contact wall portions 19*c* to undergo elastic displacements in the short-side direction (the Y axis direction).

To be more specific, the first contact wall portions 19*a* and the second contact wall portions 19*c* extend between the upper side and the lower side in the insertion and removal direction (the Z axis direction) and protrude obliquely inward in the short-side direction (the Y axis direction). When the male electrical connector 20 is inserted into its counterpart, namely, the female electrical connector 10, the first contact wall portions 19*a* and the second contact wall portions 19*c* protruding obliquely inward undergo outward elastic displacements in the short-side direction (the Y axis direction) and elastically come in contact with the second external terminal 26. With the male electrical connector 20 being inserted into the female electrical connector 10, the first contact engagement portions 19*b* and the second contact engagement portions 19*d* of the first external terminal 16 are caught in the respective second engagement target portions 29*a* of the second external terminal 26. Accordingly, the male electrical connector 20 is mated with the female electrical connector 10.

As illustrated in FIGS. 6 to 9, the first holding member 11 includes the first restricting portions 43*a* and the second restricting portions 43*b*. Each of the first restricting portions 43*a* is located close to the corresponding one of the first contact wall portions 19*a* to compensate for misalignment in the mated state. Each of the second restricting portions 43*b* is located close to the corresponding one of the second contact wall portions 19*c* to compensate for misalignment in the mated state.

One of the first restricting portions 43*a* is located on one side in the long-side direction (the X axis direction) (e.g., the right side in FIG. 7) and on the first side in the short-side direction (the Y axis direction) (e.g., the upper side in FIG. 7) and has a first restricting surface 44*a*, which is located on the inner side in the short-side direction (the Y axis direction) and extends in both the long-side direction (the X axis direction) and the insertion and removal direction (the Z axis direction). When viewed in the short-side direction (the Y axis direction), the first restricting surface 44*a* of the first restricting portion 43*a* extends alongside the first contact wall portion 19*a* in the long-side direction (the X axis direction) and/or is closer than the first contact wall portion 19*a* to the first right corner 19*g*.

Referring to FIG. 9, the first restricting portion 43*a* located on one side in the long-side direction (the X axial direction) (e.g., the right side in FIG. 7) and on the first side in the short-side direction (the Y axis direction) (e.g., the upper side in FIG. 7) includes an adjoining first restricting portion 48 and an outer first restricting portion 46. The adjoining first restricting portion 48 adjoins the first contact wall portion 19*a*. The outer first restricting portion 46 is closer than the first contact wall portion 19*a* to the first right corner 19*g*. The first restricting surface 44*a* includes an adjoining first restricting surface 49 and an outer first restricting surface 47. The adjoining first restricting surface 49 adjoins the first contact wall portion 19*a*. The outer first restricting surface 47 is closer than the first contact wall portion 19*a* to the first right corner 19*g*. The outer first restricting portion 46 is longer than the adjoining first restricting portion 48 and is closer than the adjoining first restricting portion 48 to the upper side in the insertion and removal direction (the Z axis direction). Thus, the first restricting portion 43*a* is L-shaped when viewed in the short-side direction (the Y axis direction). Likewise, the outer first restricting surface 47 is longer than the adjoining first restricting surface 49 and is closer than the adjoining first restricting surface 49 to the upper side in the insertion and removal direction (the Z axis direction). Thus, the first restricting surface 44*a* is L-shaped when viewed in the short-side direction (the Y axis direction).

The other first restricting portion 43*a* is located on the other side in the long-side direction (the X axis direction) (e.g., the left side in FIG. 7) and on the first side in the short-side direction (the Y axis direction) (e.g., the upper side in FIG. 7) and has a first restricting surface 44*a*, which is located on the inner side in the short-side direction (the Y axis direction) and extends in both the long-side direction (the X axis direction) and the insertion and removal direction (the Z axis direction). When viewed in the short-side direction (the Y axis direction), the first restricting surface 44*a* of the first restricting portion 43*a* extends alongside the first contact wall portion 19*a* in the long-side direction (the X axis direction) and/or is closer than the first contact wall portion 19*a* to the first left corner 19*i*.

The first restricting portion 43*a* (see FIG. 8) located on the other side in the long-side direction (the X axial direction) (e.g., the left side in FIG. 7) and on the first side in the short-side direction (the Y axis direction) (e.g., the upper side in FIG. 7) includes an adjoining first restricting portion 48 and an outer first restricting portion 46. The adjoining first restricting portion 48 adjoins the first contact wall portion 19*a*. The outer first restricting portion 46 is closer than the first contact wall portion 19*a* to the first left corner 19*i*. The first restricting surface 44*a* includes an adjoining first restricting surface 49 and an outer first restricting surface 47. The adjoining first restricting surface 49 adjoins the first contact wall portion 19*a*. The outer first restricting surface 47 is closer than the first contact wall portion 19*a* to the first left corner 19*i*. The outer first restricting portion 46 is longer than the adjoining first restricting portion 48 and is closer than the adjoining first restricting portion 48 to the upper side in the insertion and removal direction (the Z axis direction). Thus, the first restricting portion 43*a* is L-shaped when viewed in the short-side direction (the Y axis direction). Likewise, the outer first restricting surface 47 is longer than the adjoining first restricting surface 49 and is closer than the adjoining first restricting surface 49 to the upper side in the insertion and removal direction (the Z axis direction). Thus, the first restricting surface 44*a* is L-shaped when viewed in the short-side direction (the Y axis direction).

One of the second restricting portions 43*b* is located on one side in the long-side direction (the X axis direction) (e.g., the right side in FIG. 7) and on the second side in the short-side direction (the Y axis direction) (e.g., the lower side in FIG. 7) and has a second restricting surface 44*b*, which is located on the inner side in the short-side direction (the Y axis direction) and extends in both the long-side direction (the X axis direction) and the insertion and removal direction (the Z axis direction). When viewed in the short-side direction (the Y axis direction), the second restricting surface 44*b* of the second restricting portion 43*b* extends alongside the second contact wall portion 19*c* in the long-side direction (the X axis direction) and/or is closer than the second contact wall portion 19*c* to the second right corner 19*h*.

The other second restricting portion 43*b* is located on another side in the long-side direction (the X axis direction)

(e.g., the right side in FIG. 7) and on the second side in the short-side direction (the Y axis direction) (e.g., the lower side in FIG. 7) and has a second restricting surface 44*b*, which is located on the inner side in the short-side direction (the Y axis direction) and extends in both the long-side direction (the X axis direction) and the insertion and removal direction (the Z axis direction). When viewed in the short-side direction (the Y axis direction), the second restricting surface 44*b* of the second restricting portion 43*b* extends alongside the second contact wall portion 19*c* in the long-side direction (the X axis direction) and/or is closer than the second contact wall portion 19*c* to the second left corner 19*j*.

The second restricting portion 43*b* located on one side in the long-side direction (the X axial direction) (e.g., the right side in FIG. 7) and on the second side in the short-side direction (the Y axis direction) (e.g., the lower side in FIG. 7) includes an adjoining second restricting portion and an outer second restricting portion. The adjoining second restricting portion adjoins the second contact wall portion 19*c*. The outer second restricting portion is closer than the second contact wall portion 19*c* to the second right corner 19*h*. The second restricting surface 44*b* includes an adjoining second restricting surface and an outer second restricting surface. The adjoining second restricting surface adjoins the second contact wall portion 19*c*. The outer second restricting surface is closer than the second contact wall portion 19*c* to the second right corner 19*h*. The outer second restricting portion is longer than the adjoining second restricting portion and is closer than the adjoining second restricting portion to the upper side in the insertion and removal direction (the Z axis direction). Thus, the second restricting portion 43*b* is L-shaped when viewed in the short-side direction (the Y axis direction). Likewise, the outer second restricting surface is longer than the adjoining second restricting surface and is closer than the adjoining second restricting surface to the upper side in the insertion and removal direction (the Z axis direction). Thus, the second restricting surface 44*b* is L-shaped when viewed in the short-side direction (the Y axis direction).

The other second restricting portion 43*b* is located on the other side in the long-side direction (the X axis direction) (e.g., the left side in FIG. 7) and on the second side in the short-side direction (the Y axis direction) (e.g., the lower side in FIG. 7) and has a second restricting surface 44*b*, which is located on the inner side in the short-side direction (the Y axis direction) and extends in both the long-side direction (the X axis direction) and the insertion and removal direction (the Z axis direction). When viewed in the short-side direction (the Y axis direction), the second restricting surface 44*b* of the second restricting portion 43*b* extends alongside the second contact wall portion 19*c* in the long-side direction (the X axis direction) and/or is closer than the second contact wall portion 19*c* to the second left corner 19*j*.

The second restricting portion 43*b* located on the other side in the long-side direction (the X axial direction) (e.g., the left side in FIG. 7) and on the second side in the short-side direction (the Y axis direction) (e.g., the lower side in FIG. 7) includes an adjoining second restricting portion and an outer second restricting portion. The adjoining second restricting portion adjoins the second contact wall portion 19*c*. The outer second restricting portion is closer than the second contact wall portion 19*c* to the second left corner 19*j*. The second restricting surface 44*b* includes an adjoining second restricting surface and an outer second restricting surface. The adjoining second restricting surface adjoins the second contact wall portion 19*c*. The outer second restricting surface is closer than the second contact wall portion 19*c* to the second left corner 19*j*. The outer second restricting portion is longer than the adjoining second restricting portion and is closer than the adjoining second restricting portion to the upper side in the insertion and removal direction (the Z axis direction). Thus, the second restricting portion 43*b* is L-shaped when viewed in the short-side direction (the Y axis direction). Likewise, the outer second restricting surface is longer than the adjoining second restricting surface and is closer than the adjoining second restricting surface to the upper side in the insertion and removal direction (the Z axis direction). Thus, the second restricting surface 44*b* is L-shaped when viewed in the short-side direction (the Y axis direction).

The first holding member 11 includes first setback portions 41*a* (first openings), which are set back are set back (cut out) outward in the short-side direction (the Y axis direction) with respect to the first restricting portions 43*a*. In other words, each first setback portion 41*a* is a recess extending backward from the corresponding first restricting surface 44*a* toward the first lateral external surface portion 16*g* of the corresponding first external lateral portion 16*b*. The first setback portions 41*a* enable the first contact wall portions 19*a* to undergo outward elastic displacements in the short-side direction (the Y axis direction). The first setback portions 41*a* each have a first setback surface 42*a*, which is located on the outer side in the short-side direction (the Y axis direction) and extends in both the long-side direction (the X axis direction) and the insertion and removal direction (the Z axis direction).

The first holding member 11 includes second setback portions 41*b* (second openings), which are set back (cut out) outward in the short-side direction (the Y axis direction) with respect to the second restricting portions 43*b*. In other words, each second setback portion 41*b* is a recess extending backward from the corresponding second restricting surface 44*b* toward the first lateral external surface portion 16*g* of the corresponding first external lateral portion 16*b*. The second setback portions 41*b* enable the second contact wall portions 19*c* to undergo outward elastic displacements in the short-side direction (the Y axis direction). The second setback portions 41*b* each have a second setback surface 42*b*, which is located on the outer side in the short-side direction (the Y axis direction) and extends in both the long-side direction (the X axis direction) and the insertion and removal direction (the Z axis direction).

[Demated State and Mated State of Electrical Connector Set]

Figure 10:
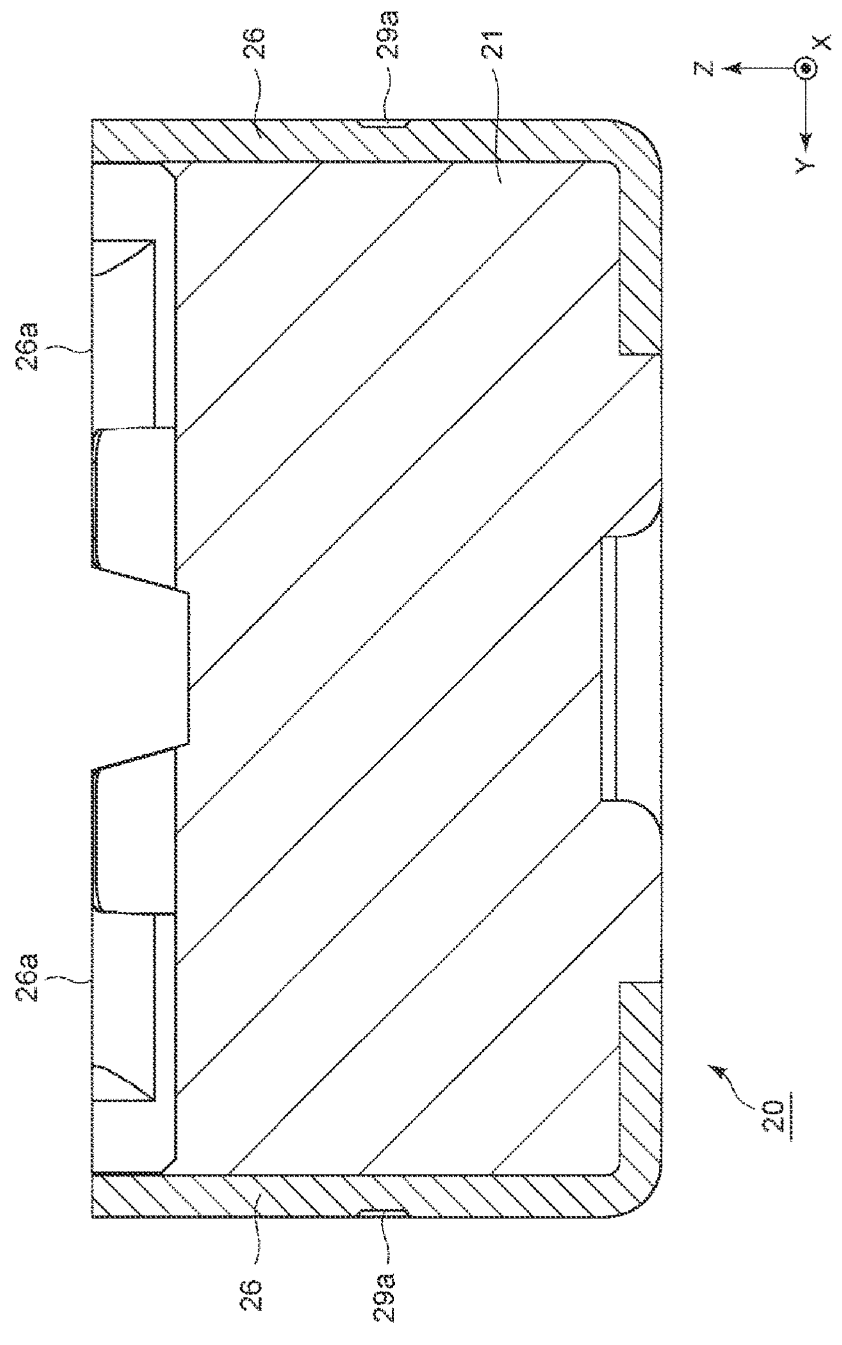
FIG. 10 is a sectional view of the male electrical connector taken along line X-X in FIG. 5.
Figure 11:
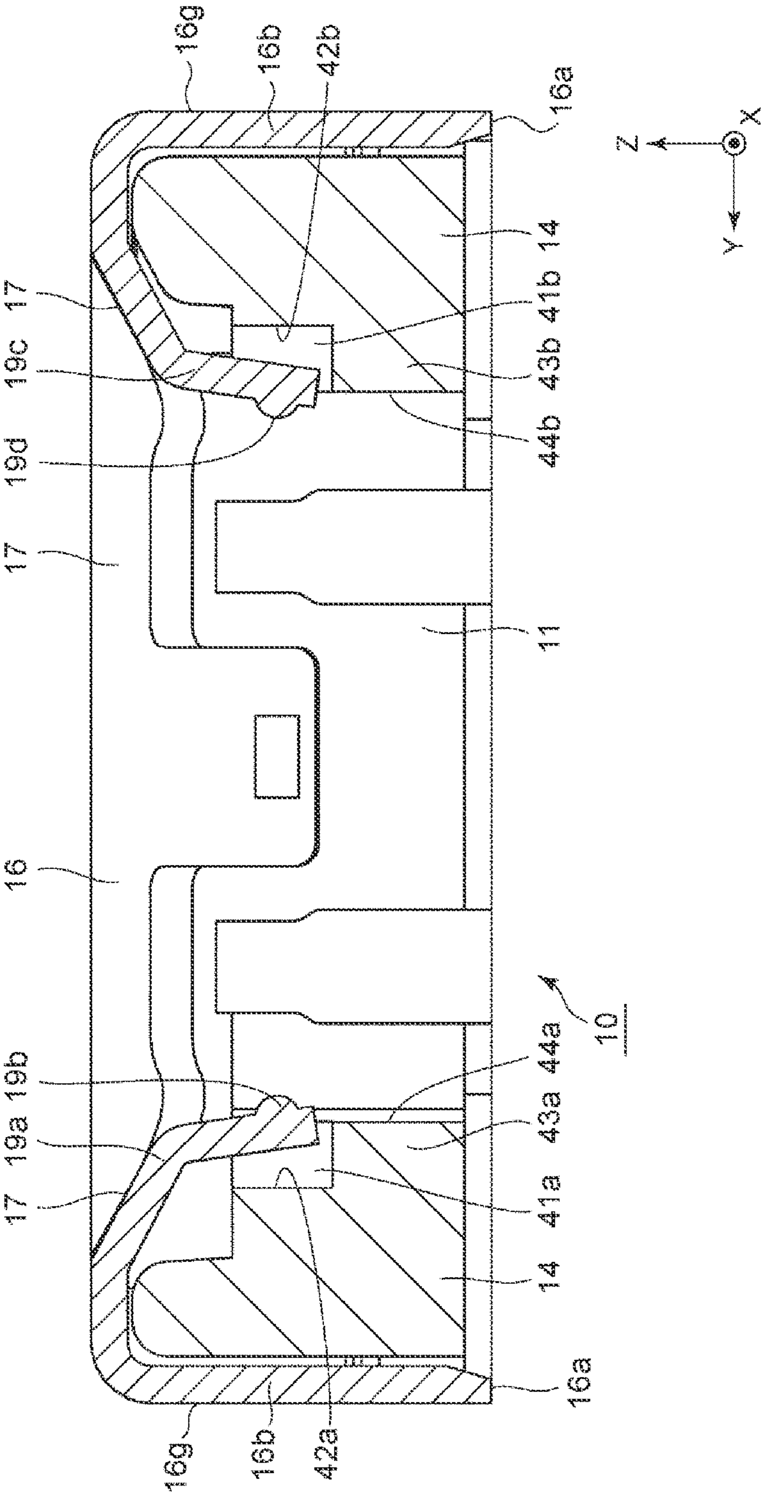
FIG. 11 is a sectional view of the female electrical connector taken along line XI-XI in FIG. 7.
Figure 12:
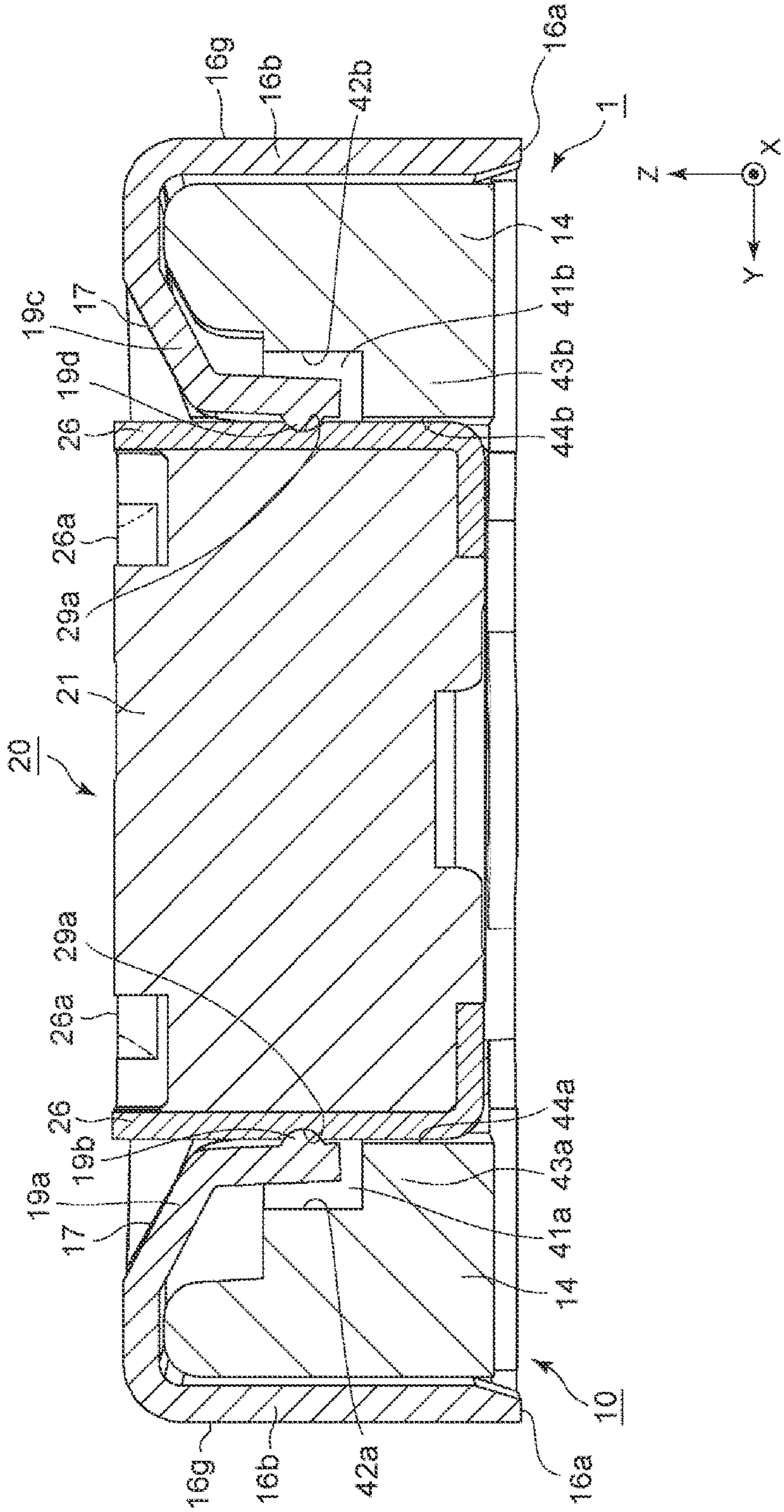
FIG. 12 is a sectional view of the electrical connector set taken along line XII-XII in FIG. 3.

The following describes the demated state and the mated state of the electrical connector set 1 with reference to FIGS. 10 to 12. FIG. 10 is a sectional view of the male electrical connector 20 taken along line X-X in FIG. 5. FIG. 11 is a sectional view of the female electrical connector 10 taken along line XI-XI in FIG. 7. FIG. 12 is a sectional view of the electrical connector set 1 taken along line XII-XII in FIG. 3.

As illustrated in FIG. 10, the second external terminal 26 of the male electrical connector 20 has lateral portions extending in the insertion and removal direction (the Z axial direction). FIG. 11 illustrates the female electrical connector 10 in the demated state, in which the first contact wall portions 19*a* and the second contact wall portions 19*c* of the first external terminal 16 extend between the upper side and the lower side in the insertion and removal direction (the Z axis direction) and protrude obliquely inward in the short-side direction (the Y axis direction). The first holding member 11 includes the first setback portions 41*a* and the second setback portions 41*b*, which are set back (cut out) outward in the short-side direction (the Y axis direction). In other words, the first restricting surface 44*a* juts inward over the first setback surface 42*a* in the short-side direction (the Y axis direction), and the second restricting surface 44*b* juts inward over the second setback surface 42*b* in the short-side direction (the Y axis direction). Thus, the first contact wall portions 19*a* and the second contact wall portions 19*c* undergo outward elastic displacements in the short-side direction (the Y axis direction) when the male electrical connector 20 is inserted into the female electrical connector 10.

As illustrated in FIG. 12, the first contact engagement portions 19*b* and the second contact engagement portions 19*d* included in the first external terminal 16 and each being in the form of a protrusion are caught in the second engagement target portions 29*a* included in the second external terminal 26 and each being in the form of a recess such that the male electrical connector 20 is mated with the female electrical connector 10. This engagement brings the electrical connector set 1 into the mated state. It is not required that the electrical connector set 1 be brought into the mated state as above; that is, the first contact engagement portions 19*b* and the second contact engagement portions 19*d* each may be in the form of a recess, and the second engagement target portions 29*a* each may be in the form of a protrusion.

[Protrusion Distance in First Restricting Portions and Protrusion Distance in Second Restricting Portions]

Figure 13:
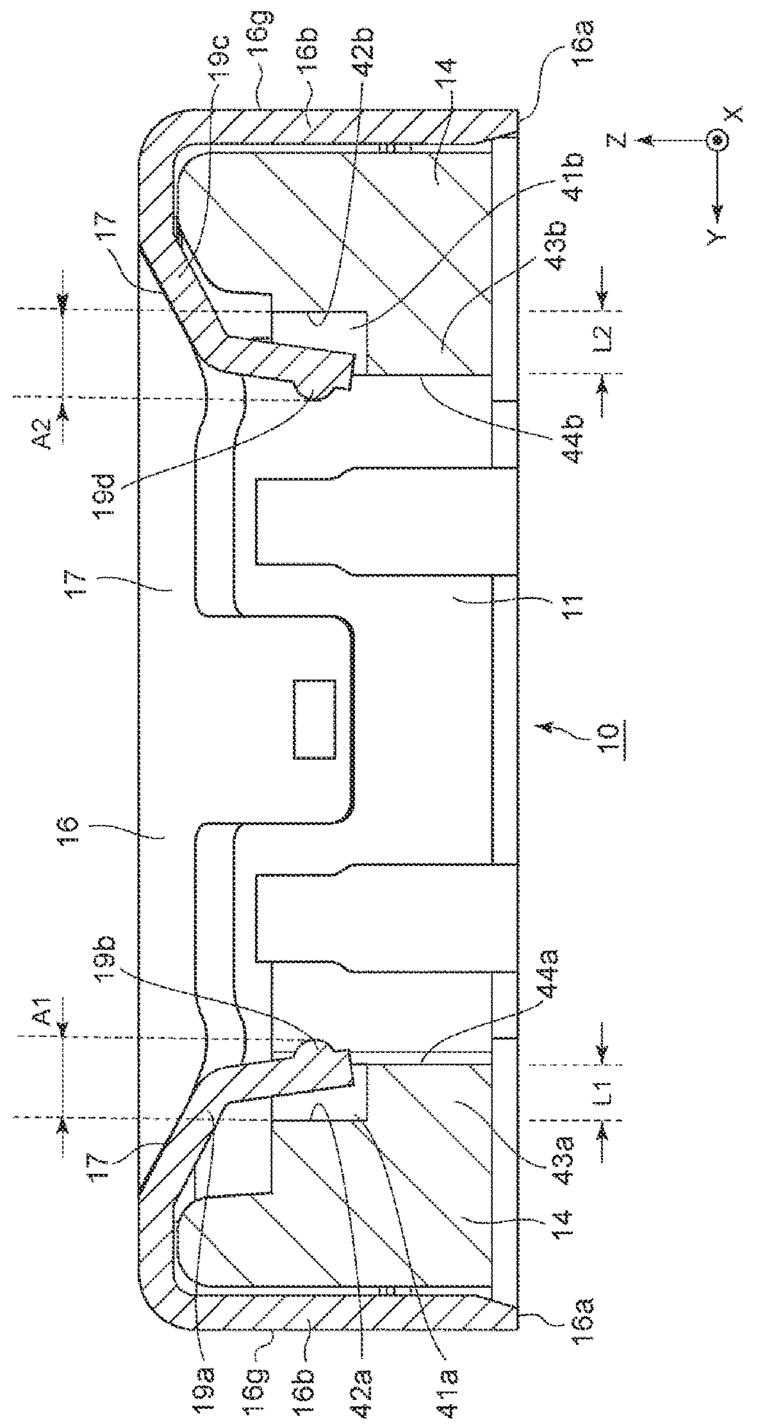
FIG. 13 is a sectional view of the female electrical connector, illustrating the female electrical connector in the demated state.
Figure 14:
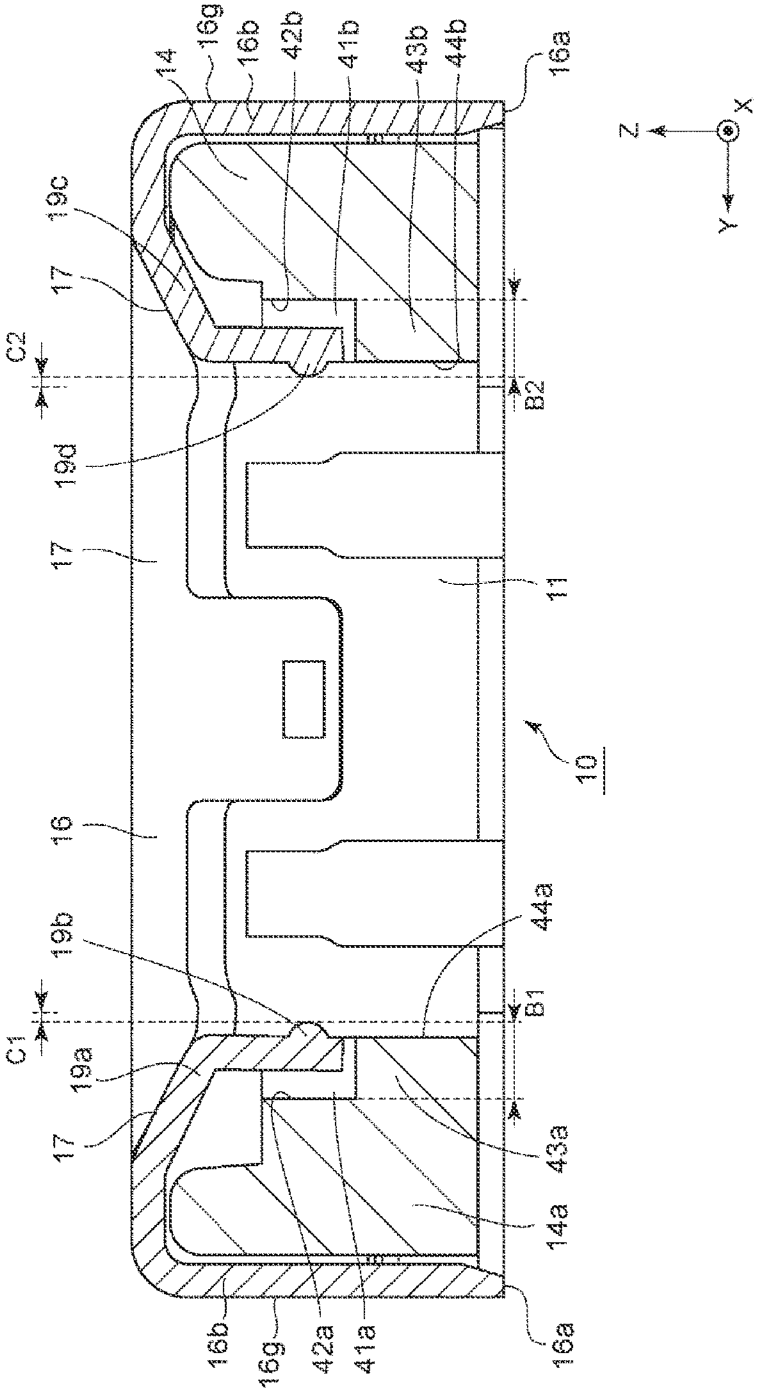
FIG. 14 is a sectional view of the female electrical connector, illustrating the female electrical connector in the mated state.

The protrusion distance in the first restricting portions 43*a* and the protrusion distance in the second restricting portions 43*b* will be described below with reference to FIGS. 13 and 14. FIG. 13 is a sectional view of the female electrical connector 10, illustrating the female electrical connector 10 in the demated state. FIG. 14 is a sectional view of the female electrical connector 10, illustrating the female electrical connector 10 in the mated state.

The following describes what are denoted by A1, A2, B1, B2, C1, C2, L1, and L2 in FIGS. 13 and 14.

A1 denotes a first protrusion distance in the demated state or, more specifically, the distance from the first setback surface 42*a* to the tip of the first contact engagement portion 19*b* of the first contact wall portion 19*a* in the short-side direction (the Y axis direction) in the demated state. A2 denotes a second protrusion distance in the demated state or, more specifically, the distance from the second setback surface 42*b* to the tip of the second contact engagement portion 19*d* of the second contact wall portion 19*c* in the short-side direction (the Y axis direction) in the demated state.

B1 denotes a first protrusion distance in the mated state or, more specifically, the distance from the first setback surface 42*a* to the tip of the first contact engagement portion 19*b* of the first contact wall portion 19*a* in the short-side direction (the Y axis direction) in the mated state. B2 denotes a second protrusion distance in the mated state or, more specifically, the distance from the second setback surface 42*b* to the tip of the second contact engagement portion 19*d* of the second contact wall portion 19*c* in the short-side direction (the Y axis direction) in the mated state.

C1 denotes a first displacement distance in the short-side direction (the Y axis direction) or, more specifically, the distance between the position of the tip of the first contact engagement portion 19*b* in the demated state and the position of the tip of the first contact engagement portion 19*b* in the mated state. C2 denotes a second displacement distance in the short-side direction (the Y axis direction) or, more specifically, the distance between the position of the tip of the second contact engagement portion 19*d* in the demated state and the position of the tip of the second contact engagement portion 19$d$ in the mated state.

L1 denotes a first setback distance or, more specifically, the distance from the first setback surface 42$a$ to the first restricting surface 44$a$, that is, the protrusion distance of the first restricting portion 43$a$ in the short-side direction (the Y axis direction). L2 denotes a second setback distance or, more specifically, the distance from the second setback surface 42$b$ to the second restricting surface 44$b$, that is, the protrusion distance of the second restricting portion 43$b$ in the short-side direction (the Y axis direction).

The first displacement distance C1 is obtained by subtracting the first protrusion distance B1 in the mated state from the first protrusion distance A1 in the demated state. The second displacement distance C2 is obtained by subtracting the second protrusion distance B2 in the mated state from the second protrusion distance A2 in the demated state.

It is required that the first setback distance L1 on the first side of the female electrical connector 10 be less than the first protrusion distance B1 in the mated state such that the first restricting surface 44$a$ of the first restricting portion 43$a$ does not become an impediment to the mating. This relationship is expressed as follows:

$$\text{the first setback distance } L1 < \text{the first protrusion distance } B1 \text{ in the mated state} \quad (1)$$

If the first setback distance L1 is too short, the female electrical connector 10 would lean to the first side, resulting in poor contact at the second contact engagement portion 19$d$ of the second contact wall portion 19$c$ on the second side. In terms of prevention of poor contact resulting from the shift toward the first side, it is required that the sum of the first setback distance L1 and the second displacement distance C2 be greater than the first protrusion distance B1 in the mated state. This relationship is expressed as follows: the first setback distance L1+the second displacement distance C2>the first protrusion distance B1 in the mated state. This inequality can be rewritten as follows:

$$\text{the first protrusion distance } B1 \text{ in the mated state} - \text{the second displacement distance } C2 < \text{the first setback distance } L1 \quad (2)$$

Inequality (1) and Inequality (2) can be combined into B1−C2<L1<B1. Substitution of Equation C2=A2−B2 into this inequality yields the following inequality:

$$B1-(A2-B2)<L1<B1 \quad (3)$$

Likewise, it is required that the second setback distance L2 on the second side of the female electrical connector 10 be less than the second protrusion distance B2 in the mated state such that the second restricting surface 44$b$ of the second restricting portion 43$b$ does not become an impediment to the mating. This relationship is expressed as follows:

$$\text{the second setback distance } L2 < \text{the second protrusion distance } B2 \text{ in the mated state} \quad (4)$$

If the second setback distance L2 is too short, the female electrical connector 10 would lean to the second side, resulting in poor contact at the first contact engagement portion 19$b$ of the first contact wall portion 19$a$ on the first side. In terms of prevention of poor contact resulting from the shift toward the second side, it is required that the sum of the second setback distance L2 and the first displacement distance C1 be greater than the second protrusion distance B2 in the mated state. This relationship is expressed as follows: the second setback distance L2+the first displacement distance C1>the second protrusion distance B2 in the mated state. This inequality can be rewritten as follows:

$$\text{the second protrusion distance } B2 \text{ in the mated state} - \text{the first displacement distance } C1 < \text{the second setback distance } L2 \quad (5)$$

Inequality (4) and Inequality (5) can be combined into B2−C1<L2<B2. Substitution of Equation C1=A1-B1 into this inequality yields the following inequality:

$$B2-(A1-B1)<L2<B2 \quad (6)$$

When the first setback distance L1 and the second setback distance L2 satisfy Inequality (3) and Inequality (6), respectively, misalignment between the female electrical connector 10 and the male electrical connector 20 in the mated state is compensated for, and the occurrence of poor contact between contact portions, namely, each of the first contact engagement portions 19$b$ and the corresponding one of the second contact engagement portions 19$d$ is eliminated or reduced.

Each of the first contact wall portions 19$a$, the first restricting portions 43$a$, the first setback portions 41$a$, and the first contact engagement portions 19$b$ faces the corresponding one of the second contact wall portions 19$c$, the second restricting portions 43$b$, the second setback portions 41$b$, and the second contact engagement portions 19$d$, with a plane between them being orthogonal to the short-side direction (the Y axis direction). This feature simplifies the structure of the female electrical connector 10, which is thus less costly. Each of the first contact wall portions 19$a$, the first restricting portions 43$a$, the first setback portions 41$a$, and the first contact engagement portions 19$b$ are diametrically opposite to the corresponding one of the second contact wall portions 19$c$, the second restricting portions 43$b$, the second setback portions 41$b$, and the second contact engagement portions 19$d$, with a plane of symmetry between them being orthogonal to the short-side direction (the Y axis direction). This feature further simplifies the structure of the female electrical connector 10, which is thus much less costly.

Second Embodiment

Figure 15:
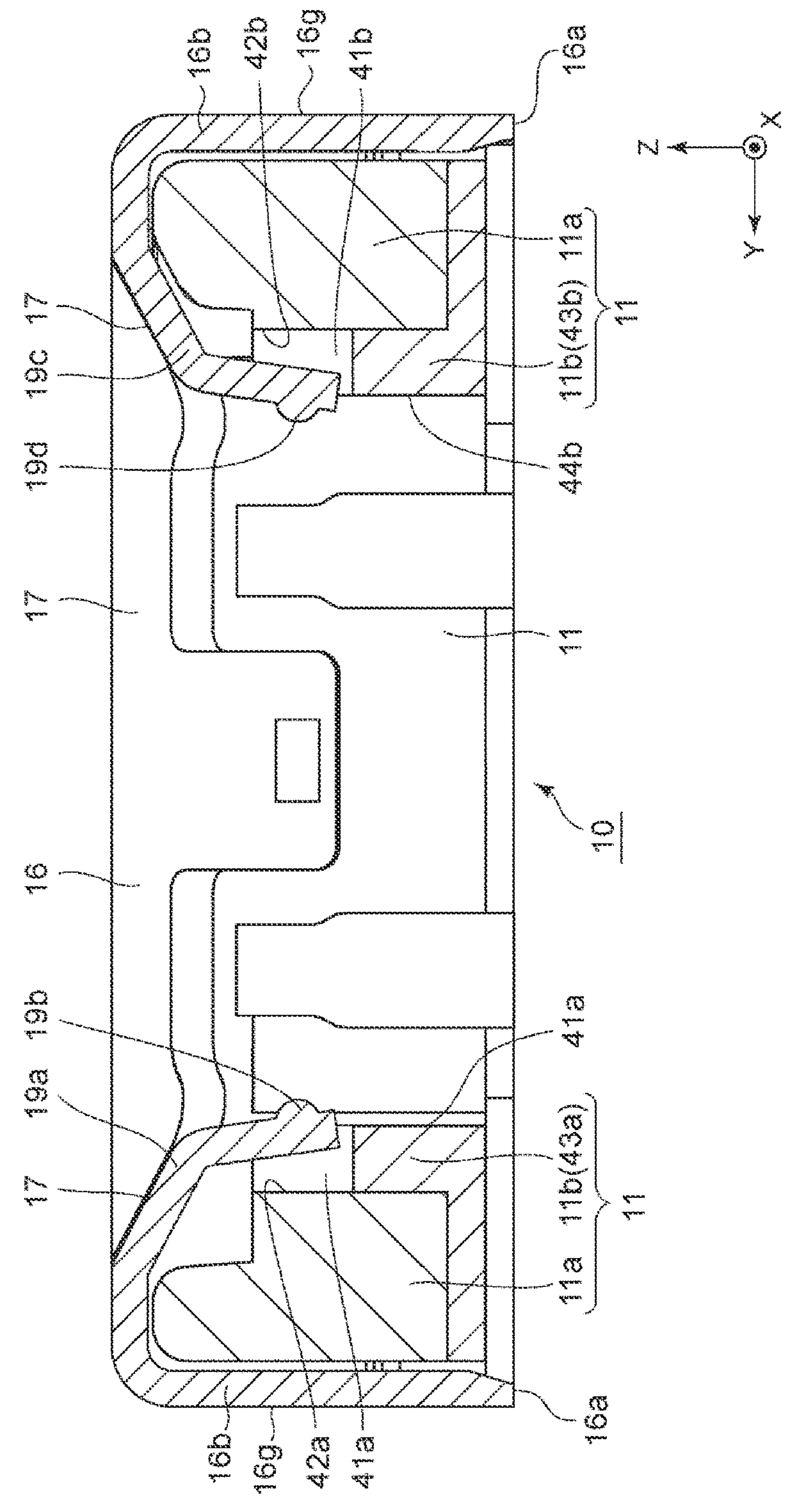
FIG. 15 is a sectional view of a female electrical connector according to a second embodiment.

A second embodiment of the present disclosure will be described below with reference to FIG. 15. FIG. 15 is a sectional view of a female electrical connector according to the second embodiment. The female electrical connector is denoted by 10.

The female electrical connector 10 according to the second embodiment is characterized as follows. The base material 11$a$ of the first holding member 11 is a resin member. Each of the first restricting portions 43$a$ and the second restricting portions 43$b$ is a metal member 11$b$.

The first restricting portions 43$a$ and the second restricting portions 43$b$ are harder than the base material 11$a$ of the first holding member 11 in the present embodiment, in which the base material 11$a$ is a resin member, and each of the first restricting portions 43$a$ and the second restricting portions 43$b$ is the metal member 11$b$. The resistance to abrasion associated with the sliding motion of the electrical conductors contacting each other at the time of mating is improved accordingly.

The first restricting portions 43$a$ and the second restricting portions 43$b$ each being the metal member 11$b$ are designed to enable the use of an electrically conductive bonding material, such as solder or an electrically conductive adhesive, for the mounting of the female electrical connector 10. Accordingly, the female electrical connector 10 mounted onto the circuit board is firmly fixed to the circuit board, thus eliminating or reducing the occurrence of misalignment in the mated state.

Third Embodiment

Figure 16:
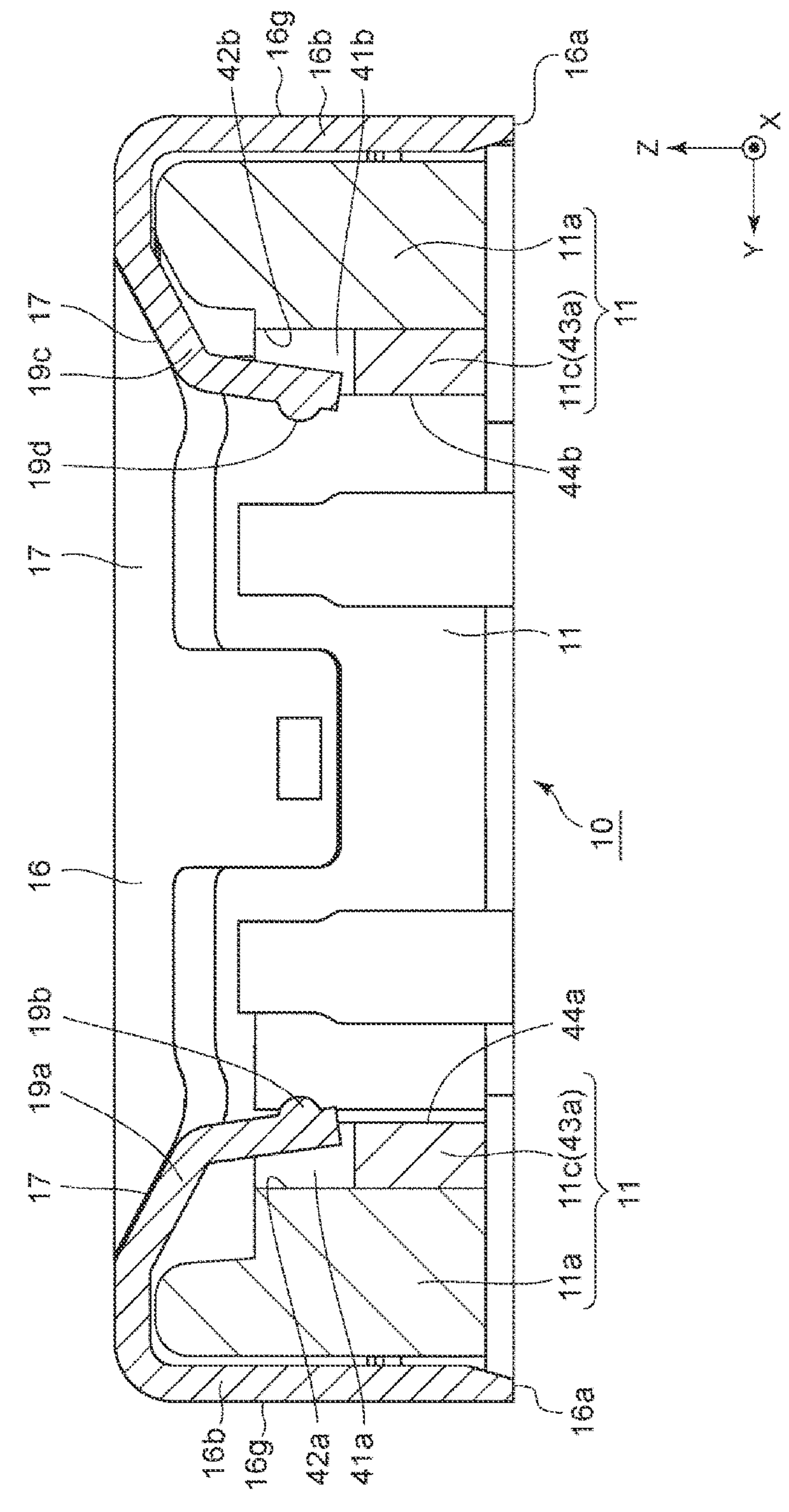
FIG. 16 is a sectional view of a female electrical connector according to a third embodiment.

A third embodiment of the present disclosure will be described below with reference to FIG. 16. FIG. 16 is a sectional view of a female electrical connector according to the third embodiment. The female electrical connector is denoted by 10.

The female electrical connector 10 according to the third embodiment is characterized as follows. The base material 11*a* of the first holding member 11 is a resin member. Each of the first restricting portions 43*a* and the second restricting portions 43*b* is a hard member 11*c*, which is harder than the base material 11*a* and has electrical insulation properties. The hard member 11*c* being harder than the base material 11*a* and having electrical insulation properties may be a resinous material, such as polyetherketone (PEEK) resin, or may be a ceramic material, such as alumina. The resistance to abrasion associated with the sliding motion of the electrical conductors contacting each other at the time of mating is improved accordingly.

Although embodiments of the present disclosure have been concretely described so far, it should be noted that the present disclosure is not limited to the embodiments; that is, various alterations may be made within the scope of the present disclosure.

The first restricting portions 43*a* in the embodiment described above include the respective adjoining first restricting portions 48 and/or the respective outer first restricting portions 46. When viewed in the short-side direction (the Y axis direction), each of the adjoining first restricting portions 48 extends alongside the corresponding one of the first contact wall portions 19*a*, each of which is closer than the first internal terminals 12 to the corresponding one of the first right corner 19*g* and the first left corner 19*i* in the long-side direction (the X axis direction). Each of the outer first restricting portions 46 is closer than the first contact wall portions 19*a* to the corresponding one of the first right corner 19*g* and the first left corner 19*i*. In other words, the first restricting portions 43*a* each include at least one of the adjoining first restricting portion 48 or the outer first restricting portion 46. The second restricting portions 43*b* in the embodiment described above include the respective adjoining second restricting portions and/or the respective outer second restricting portions. When viewed in the short-side direction (the Y axis direction), each of the adjoining second restricting portions extends alongside the corresponding one of the second contact wall portions 19*c*, each of which is closer than the first internal terminals 12 to the corresponding one of the second right corner 19*h* and the second left corner 19*j* in the long-side direction (the X axis direction). Each of the second restricting portions is closer than the second contact wall portions 19*c* to the corresponding one of the second right corner 19*h* and the second left corner 19*j*. In other words, the first restricting portions 43*a* each include at least one of the adjoining second restricting portion or the outer second restricting portion. Thus, misalignment of the male electrical connector 20 in the mated state is more effectively compensated for, and the occurrence of poor contact at contact portions will be eliminated or reduced accordingly. This feature also enables a shortening of the female electrical connector 10 in the long-side direction (in the X axis direction).

The first restricting portion 43*a* on one side in the long-side direction (the X axis direction) (e.g., the right side in FIG. 7) is L-shaped when viewed in the short-side direction (the Y axis direction). In some embodiments, however, the adjoining first restricting portion 48 of the first restricting portion 43*a* extends straight to the first right corner 19*g* in the long-side direction (the X axis direction) with no change in height. The first restricting portion 43*a* on the other side in the long-side direction (the X axis direction) (e.g., the left side in FIG. 7) is L-shaped when viewed in the short-side direction (the Y axis direction). In some embodiments, however, the adjoining first restricting portion 48 of the first restricting portion 43*a* extends straight to the first left corner 19*i* in the long-side direction (the X axis direction) with no change in height. The second restricting portion 43*b* on one side in the long-side direction (the X axis direction) (e.g., the right side in FIG. 7) is L-shaped when viewed in the short-side direction (the Y axis direction). In some embodiments, however, the second restricting portion 43*b* extends straight to the second right corner 19*h* in the long-side direction (the X axis direction) with no change in height. The second restricting portion 43*b* on the other side in the long-side direction (the X axis direction) (e.g., the left side in FIG. 7) is L-shaped when viewed in the short-side direction (the Y axis direction). In some embodiments, however, the second restricting portion 43*b* extends straight to the second left corner 19*j* in the long-side direction (the X axis direction) with no change in height.

As portions in close proximity to the first contact wall portions 19*a*, the first restricting portions 43*a* each may be located between an outer part of a row of the first internal terminals 12 in the long-side direction (the X axis direction) and the corresponding first contact wall portion 19*a*. As portions in close proximity to the second contact wall portions 19*c*, the second restricting portions 43*b* each may be located between an outer part of a row of the first internal terminals 12 in the long-side direction (the X axis direction) and the corresponding second contact wall portion 19*c*. This leads to a slight increase in the length of the female electrical connector 10 in the long-side direction (the X axis direction); nevertheless, misalignment of the male electrical connector 20 in the mated state is compensated for, and the occurrence of poor contact at contact portions will be eliminated or reduced accordingly.

The first restricting portions 43*a* and the second restricting portions 43*b* mentioned above also eliminate or reduces the occurrence of poor contact at contact portions of the first internal terminals 12 and contact portions of the first shield terminals 15.

The present disclosure and embodiments thereof may be summarized as follows.

An electrical connector 10 according to an embodiment of the present disclosure is a female electrical connector 10 including a plurality of internal terminals 12, an external terminal 16, and a holding member 11. The external terminal 16 surrounds the plurality of internal terminals 12. The holding member 11 holds the plurality of internal terminals 12 and the external terminal 16 and extends in a long-side direction (the X axis direction) and a short-side direction (the Y axis direction). The plurality of internal terminals 12 are arranged in the long-side direction (the X axis direction). The external terminal 16 includes a first contact wall portion 19*a* closer than the plurality of internal terminals 12 to a corner 19*g* or 19*i* in the long-side direction (the X axis direction) and a second contact wall portion 19*c* closer than the plurality of internal terminals 12 to a corner 19*h* or 19*j* in the long-side direction (the X axis direction). The first contact wall portion 19a and the second contact wall portion 19c face each other in the short-side direction (the Y axis direction). The first holding member 11 includes a first restricting portion 43a and a second restricting portion 43b. The first restricting portion 43a is located close to the first contact wall portion 19a to compensate for misalignment in a mated state. The second restricting portion 43b is located close to the second contact wall portion 19c to compensate for misalignment in the mated state.

The first restricting portion 43a in close proximity to the first contact wall portion 19a close to the corner 19g or 19i in the long-side direction (the X axis direction) and the second restricting portion 43b in close proximity to the second contact wall portion 19c close to the corner 19h or 19j compensate for misalignment in the mated state and thus eliminate or reduce the occurrence of poor contact at contact portions.

The electrical connector 10 according to an embodiment is characterized as follows. When viewed in the short-side direction (the Y axis direction), the first restricting portion 43a extends alongside the first contact wall portion 19a in the long-side direction (the X axis direction) and/or is closer than the first contact wall portion 19a to the corner 19g or 19i. When viewed in the short-side direction (the Y axis direction), the second restricting portion 43b extends alongside the second contact wall portion 19c in the long-side direction (the X axis direction) and/or is closer than the second contact wall portion 19c to the corner 19h or 19j.

In this embodiment, misalignment in the mated state is more effectively compensated for, and the occurrence of poor contact at contact portions will be eliminated or reduced accordingly. This feature also enables a shortening of the female electrical connector 10 in the long-side direction (in the X axis direction).

The electrical connector 10 according to an embodiment is characterized as follows: the first restricting portion 43a and the second restricting portion 43b are each located on opposite sides with respect to a plane orthogonal to the long-side direction (the X axis direction).

In this embodiment, misalignment in the mated state is more effectively compensated for, and the occurrence of poor contact at contact portions will be eliminated or reduced accordingly.

The electrical connector 10 according to an embodiment is characterized as follows. The holding member 11 includes a first setback portion 41a and a second setback portion 41b. The first setback portion 41a is set back outward in the short-side direction (the Y axis direction) with respect to the first restricting portion 43a. The second setback portion 41b is set back outward in the short-side direction (the Y axis direction) with respect to the second restricting portion 43b.

This embodiment the first contact wall portion 19a and the second contact wall portion 19c to undergo outward elastic displacements in the short-side direction (the Y axis direction).

The electrical connector 10 according to an embodiment is characterized as follows: the first restricting portion 43a and the second restricting portion 43b are made of a resinous material being a base material of the holding member 11 and are integral with the holding member 11.

The holding member 11 in this embodiment can thus be produced at low cost.

The electrical connector 10 according to an embodiment is characterized as follows: the first restricting portion 43a and the second restricting portion 43b are harder than a base material 11a of the holding member 11.

This embodiment enables an improvement in the resistance to abrasion associated with the sliding motion of electrical connectors contacting each other at the time of mating.

The electrical connector 10 according to an embodiment is characterized as follows. The base material 11a of holding member 11 is a resin member. Each of the first restricting portion 43a and the second restricting portion 43b is a resin member harder than the base material 11a.

This embodiment enables an improvement in the resistance to abrasion associated with the sliding motion of electrical connectors contacting each other at the time of mating.

The electrical connector 10 according to an embodiment is characterized as follows. The base material 11a of the holding member 11 is a resin member. Each of the first restricting portion 43a and the second restricting portion 43b is a metal member.

This embodiment enables an improvement in the resistance to abrasion associated with the sliding motion of electrical connectors contacting each other at the time of mating.

The electrical connector 10 according to an embodiment is characterized as follows: the first restricting portion 43a and the second restricting portion 43b are designed to enable use of an electrically conductive bonding material for mounting of the electrical connector 10 onto a circuit board.

In this embodiment, the female electrical connector 10 mounted onto the circuit board is firmly fixed to the circuit board, thus eliminating or reducing the occurrence of misalignment in the mated state.

The electrical connector 10 according to an embodiment is characterized as follows. The first contact wall portion 19a is cantilevered and includes a first contact engagement portion 19b. The second contact wall portion 19c is cantilevered and includes a second contact engagement portion 19d.

This embodiment enables the first contact wall portion 19a and the second contact wall portion 19c to undergo elastic displacements in the short-side direction (the Y axis direction) and ensures a good fit.

The electrical connector 10 according to an embodiment is characterized as follows: the first contact engagement portion 19b and the second contact engagement portion 19d protrude inward in the short-side direction (the Y axis direction).

This embodiment enables ensures a good fit.

The electrical connector 10 according to an embodiment is characterized as follows: an inequality $B1-(A2-B2)<L1<B1$ and an inequality $B2-(A1-B1)<L2<B2$ hold, where A1 denotes a first protrusion distance from a first setback surface 42a of the first setback portion 41a to the first contact engagement portion 19b in the short-side direction (the Y axis direction) in a demated state, A2 denotes a second protrusion distance from a second setback surface 42b of the second setback portion 41b to the second contact engagement portion 19d in the short-side direction (the Y axis direction) in the demated state, B1 denotes a first protrusion distance from the first setback surface 42a of the first setback portion 41a to the first contact engagement portion 19b in the short-side direction (the Y axis direction) in a mated state, B2 denotes a second protrusion distance from the second setback surface 42b of the second setback portion 41b to the second contact engagement portion 19*d* in the short-side direction (the Y axis direction) in the mated state, L1 denotes a first setback distance from a first restricting surface 44*a* of the first restricting portion 43*a* to the first setback surface 42*a* in the short-side direction (the Y axis direction), and L2 denotes a second setback distance from a second restricting surface 44*b* of the second restricting portion 43*b* to the second setback surface 42*b* in the short-side direction (the Y axis direction).

In this embodiment, misalignment in the mated state is compensated for, and the occurrence of poor contact at contact portions will be eliminated or reduced accordingly.

The electrical connector 10 according to an embodiment is characterized as follows: each of the first contact wall portion 19*a*, the first restricting portion 43*a*, the first setback portion 41*a*, and the first contact engagement portion 19*b* face the corresponding one of the second contact wall portion 19*c*, the second restricting portion 43*b*, the second setback portion 41*b*, and the second contact engagement portion 19*d*, with a plane between them being orthogonal to the short-side direction (the Y axis direction).

This embodiment simplifies the structure of the female electrical connector 10, which is thus less costly.

An electrical connector set 1 according to an embodiment of the present disclosure includes the electrical connector 10 and a male electrical connector 20 that is removably fitted into the electrical connector 10 in an insertion and removal direction.

With the electrical connector set 1 being constructed as above, misalignment in the mated state is compensated for, and the occurrence of poor contact at contact portions will be eliminated or reduced accordingly.

What is claimed is:

1. An electrical connector that is a female electrical connector comprising:

a plurality of internal terminals;

an external terminal surrounding the plurality of internal terminals; and a holding member holding the plurality of internal terminals and the external terminal and extending in a long-side direction and a short-side direction, wherein the plurality of internal terminals are arranged in the long-side direction, the external terminal includes a first contact wall portion closer than the plurality of internal terminals to a corner in the long-side direction and a second contact wall portion closer than the plurality of internal terminals to a corner in the long-side direction, with the first and second contact wall portions facing each other in the short-side direction, the holding member includes a first opening configured to receive the first contact wall portion during elastic displacement of the first contact wall portion in the short-side direction and a second opening configured to receive the second contact wall portion during elastic displacement of the second contact wall portion in the short-side direction, and the holding member includes a first restricting portion located close to the first contact wall portion to compensate for misalignment in a mated state and a second restricting portion located close to the second contact wall portion to compensate for misalignment in the mated state.

2. The electrical connector according to claim 1, wherein when viewed in the short-side direction, the first restricting portion at least one of extends alongside the first contact wall portion in the long-side direction or is closer than the first contact wall portion to the corner, and when viewed in the short-side direction, the second restricting portion at least one of extends alongside the second contact wall portion in the long-side direction or is closer than the second contact wall portion to the corner.

3. The electrical connector according to claim 1, wherein the first restricting portion and the second restricting portion are each on opposite sides with respect to a plane orthogonal to the long-side direction.

4. The electrical connector according to claim 1, wherein the first opening defines a first setback portion set back outward in the short-side direction with respect to the first restricting portion and the second opening defines a second setback portion set back outward in the short-side direction with respect to the second restricting portion.

5. The electrical connector according to claim 1, wherein the first restricting portion and the second restricting portion include a resinous material being a base material of the holding member and are integral with the holding member.

6. The electrical connector according to claim 1, wherein the first restricting portion and the second restricting portion are harder than a base material of the holding member.

7. The electrical connector according to claim 6, wherein the base material of holding member includes a resin member, and each of the first restricting portion and the second restricting portion includes a resin member harder than the base material.

8. The electrical connector according to claim 6, wherein the base material of the holding member includes a resin member, and each of the first restricting portion and the second restricting portion includes a metal member.

9. The electrical connector according to claim 8, wherein the first restricting portion and the second restricting portion are configured to enable use of an electrically conductive bonding material to mount the electrical connector onto a circuit board.

10. The electrical connector according to claim 1, wherein the first contact wall portion is cantilevered and includes a first contact engagement portion, and the second contact wall portion is cantilevered and includes a second contact engagement portion.

11. The electrical connector according to claim 10, wherein the first contact engagement portion and the second contact engagement portion protrude inward in the short-side direction.

12. The electrical connector according to claim 11, wherein an inequality $B1-(A2-B2)<L1<B1$ and an inequality $B2-(A1-B1)<L2<B2$ hold, where A1 denotes a first protrusion distance from a first setback surface of a first setback portion, defined by the first opening, to the first contact engagement portion in the short-side direction in a demated state, A2 denotes a second protrusion distance from a second setback surface of a second setback portion, defined by the second opening, to the second contact engagement portion in the short-side direction in the demated state, B1 denotes a first protrusion distance from the first setback surface of the first setback portion to the first contact engagement portion in the short-side direction in a mated state, B2 denotes a second protrusion distance from the second setback surface of the second setback portion to the second contact engagement portion in the short-side direction in the mated state, L1 denotes a first setback distance from a first restricting surface of the first restricting portion to the first setback surface in the short-side direction, and L2 denotes a second setback distance from a second restricting surface of the second restricting portion to the second setback surface in the short-side direction.

13. The electrical connector according claim 12, wherein each of the first contact wall portion, the first restricting portion, the first setback portion, and the first contact engagement portion faces a corresponding one of the second contact wall portion, the second restricting portion, the second setback portion, and the second contact engagement portion, with a plane between them being orthogonal to the short-side direction.

14. An electrical connector set, comprising:

the electrical connector according to claim 1; and a male electrical connector that is removably fitted into the electrical connector in an insertion and removal direction.

15. The electrical connector according to claim 2, wherein the first restricting portion and the second restricting portion are each on opposite sides with respect to a plane orthogonal to the long-side direction.

16. The electrical connector according to claim 2, wherein the first opening defines a first setback portion set back outward in the short-side direction with respect to the first restricting portion and the second opening defines a second setback portion set back outward in the short-side direction with respect to the second restricting portion.

17. The electrical connector according to claim 2, wherein the first restricting portion and the second restricting portion include a resinous material being a base material of the holding member and are integral with the holding member.

18. The electrical connector according to claim 2, wherein the first restricting portion and the second restricting portion are harder than a base material of the holding member.

19. The electrical connector according to claim 2, wherein the first contact wall portion is cantilevered and includes a first contact engagement portion, and the second contact wall portion is cantilevered and includes a second contact engagement portion.

20. An electrical connector set, comprising:

the electrical connector according to claim 2; and a male electrical connector that is removably fitted into the electrical connector in an insertion and removal direction.

* * * * *